(12) United States Patent
Bloch

(10) Patent No.: US 10,627,104 B2
(45) Date of Patent: Apr. 21, 2020

(54) METHOD AND APPARATUS FOR COMMISSIONING POWER PLANTS

(71) Applicant: Boyle Energy Services & Technology, Inc., Concord, NH (US)

(72) Inventor: Christopher J. Bloch, Kingwood, TX (US)

(73) Assignee: Boyle Energy Services & Technology, Inc., Merrimack, NH (US)

(*) Notice: Subject to any disclaimer, the term of this patent is extended or adjusted under 35 U.S.C. 154(b) by 639 days.

(21) Appl. No.: 14/194,863

(22) Filed: Mar. 3, 2014

(65) Prior Publication Data

US 2014/0238507 A1 Aug. 28, 2014

Related U.S. Application Data

(62) Division of application No. 12/056,128, filed on Mar. 26, 2008, now Pat. No. 9,217,566.

(60) Provisional application No. 60/908,277, filed on Mar. 27, 2007.

(51) Int. Cl.
| | | |
|---|---|---|
| *F16L 57/06* | (2006.01) | |
| *F22B 37/48* | (2006.01) | |
| *F22B 37/52* | (2006.01) | |
| *B08B 3/02* | (2006.01) | |
| *F26B 5/04* | (2006.01) | |

(52) U.S. Cl.
CPC ............ *F22B 37/486* (2013.01); *B08B 3/02* (2013.01); *F16L 57/06* (2013.01); *F22B 37/52* (2013.01); *F26B 5/04* (2013.01); *B08B 2230/01* (2013.01); *Y10T 137/4245* (2015.04); *Y10T 137/7043* (2015.04)

(58) Field of Classification Search
CPC .......... F22B 37/486; F22B 37/52; B08B 3/02; F26B 5/04; F16L 57/06; Y10T 137/7043; Y10T 137/4245
See application file for complete search history.

(56) References Cited

U.S. PATENT DOCUMENTS

| | | | | |
|---|---|---|---|---|
| 3,194,216 A | * | 7/1965 | Grabowski | F28G 9/00 122/379 |
| 3,220,193 A | * | 11/1965 | Strohmeyer, Jr. | F01K 3/22 122/406.4 |
| 3,225,748 A | * | 12/1965 | Schuetzenduebel | F22B 29/12 122/1 R |
| 3,700,550 A | * | 10/1972 | Shiells | G21C 19/307 376/313 |
| 4,142,578 A | * | 3/1979 | Smith | F28F 9/22 165/134.1 |
| 4,638,630 A | | 1/1987 | Martens | |
| 4,921,546 A | | 5/1990 | Bloch | |

(Continued)

OTHER PUBLICATIONS

Emerson, Application Discussion AD102, Jun. 15, 2003, Emerson, 2 pages.*
Hill Publishing, Power and the Engineer, 1909, Hill Publishing, cover, and p. 180.*
Wirtz et al, High Performance Woven Mesh Heat Exchangers, University of Nevada Reno, date stamp, first page,and conlusion passages woven mesh.*

(Continued)

*Primary Examiner* — Benjamin L Osterhout
(74) *Attorney, Agent, or Firm* — Burns & Levinson LLP; Jerry Cohen

(57) ABSTRACT

An apparatus and method for commissioning steam turbine generator power plants to advance the cleanliness of the complete steam cycle by the conditioned discharge of steam to the plant surface condenser.

1 Claim, 12 Drawing Sheets

(56) References Cited

U.S. PATENT DOCUMENTS

| | | | | |
|---|---|---|---|---|
| 4,967,833 | A | * | 11/1990 | Blangetti .................. F28B 1/02 |
| | | | | 165/112 |
| 5,067,559 | A | * | 11/1991 | Perkinson ................. F28B 3/04 |
| | | | | 165/112 |
| 5,111,663 | A | | 5/1992 | Brandon |
| 5,549,078 | A | | 8/1996 | Annecharico |
| 5,562,884 | A | | 10/1996 | Oakes |
| 5,779,814 | A | | 7/1998 | Fellers |
| 5,864,596 | A | * | 1/1999 | Egerbrecht ........... C08F 220/00 |
| | | | | 210/701 |
| 6,309,513 | B1 | | 10/2001 | Sephton |
| 6,481,883 | B1 | | 11/2002 | Ellem |
| 6,881,244 | B2 | | 4/2005 | Liebig |
| 2002/0162332 | A1 | | 11/2002 | Hazlebeck |
| 2003/0000214 | A1 | | 1/2003 | Grewe |
| 2005/0001634 | A1 | | 1/2005 | Kaiser |
| 2005/0072154 | A1 | | 4/2005 | Frutschi |
| 2005/0126162 | A1 | | 6/2005 | Otake |
| 2007/0245736 | A1 | | 10/2007 | Barnicki |
| 2008/0236616 | A1 | * | 10/2008 | Bloch .................. F22B 37/486 |
| | | | | 134/2 |
| 2009/0107532 | A1 | * | 4/2009 | Lonne ....................... B08B 9/00 |
| | | | | 134/56 R |

OTHER PUBLICATIONS

Wikipedia, Condenser, Mar. 2016, Wikipedia, first paragraph.*
Elliot Spencer, Specifying Steam Surface Condernsers, Apr. 1, 2002, Graham Mfg. Co., date stamp, impingement plate paragraph.*
Graham, Surface Condernsers, Jun. 16, 2009, Graham, Date stamp, 2 paragraphs.*
General Electric Company GEk (1998, revised 2004) pp. 3, 4, 7-10, 14 (partially redacted).
Siemens Industrial Turmonachinery AB STI No. 510C-01E pp. 1, 5, and 6 (partly redacted).
"Steam Purity Recommendations for Utility Steam Turbines" General Electric Company p. 5 (2009).
Extract from Siemens Steam Turbine Information Manual (STIM) entitled "cleaning of Steam Piping" STIM-11/004 of 2001, revised 2004 showing particle contamination removal and other aspects of prior art steam blow including known artifacts and conventional terms.
A common statement of wetted diameter within a Reynolds Number explanation (http://everything2.com/title/Reynolds+number) accessed Jul. 2013.
Eng-tips.com Forum Posting, http://www.eng-tips.com/viewthread.cfm?qid=165253, accessed Apr. 12, 2016 (posting date Sep. 14, 2006).

* cited by examiner

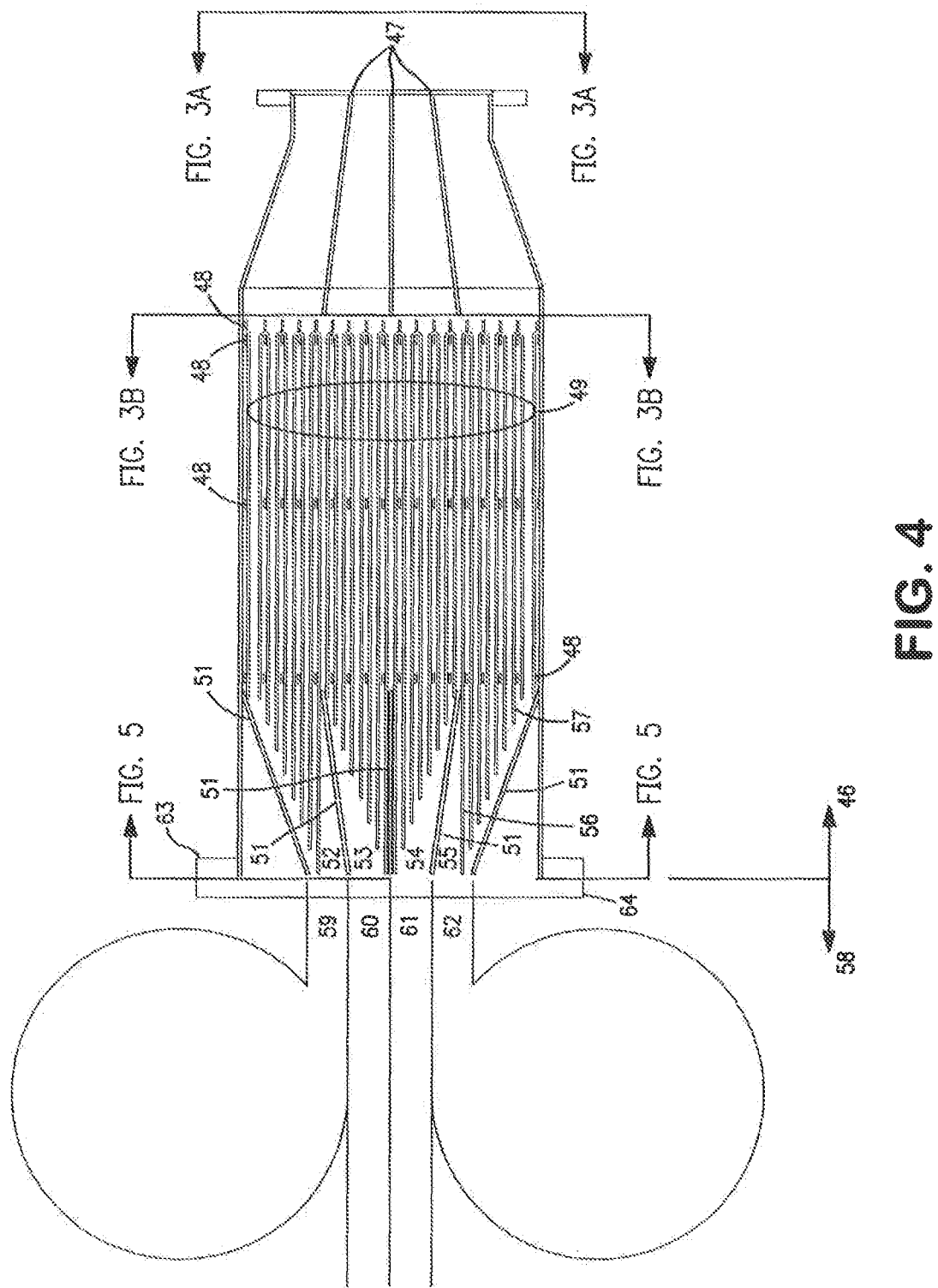

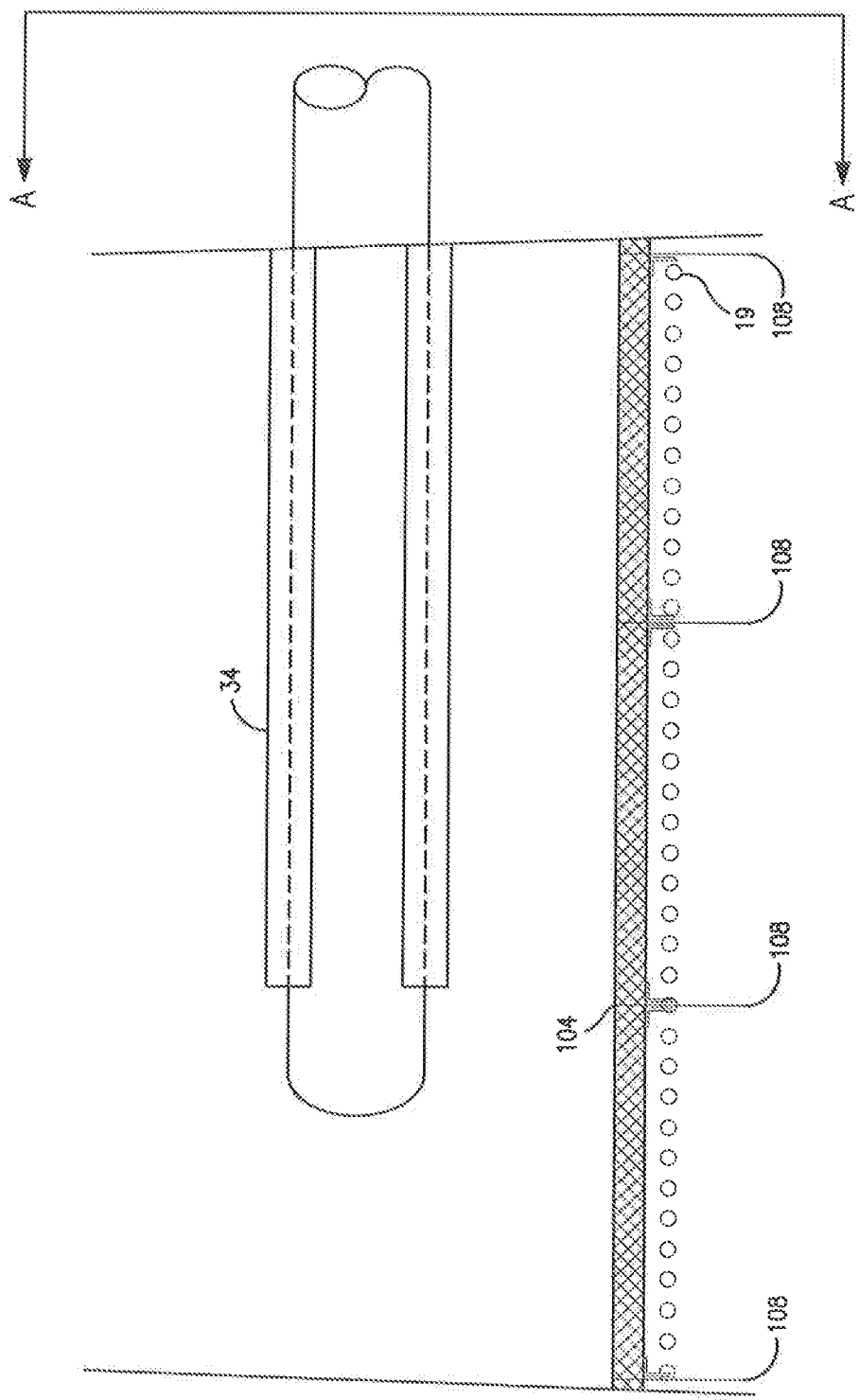

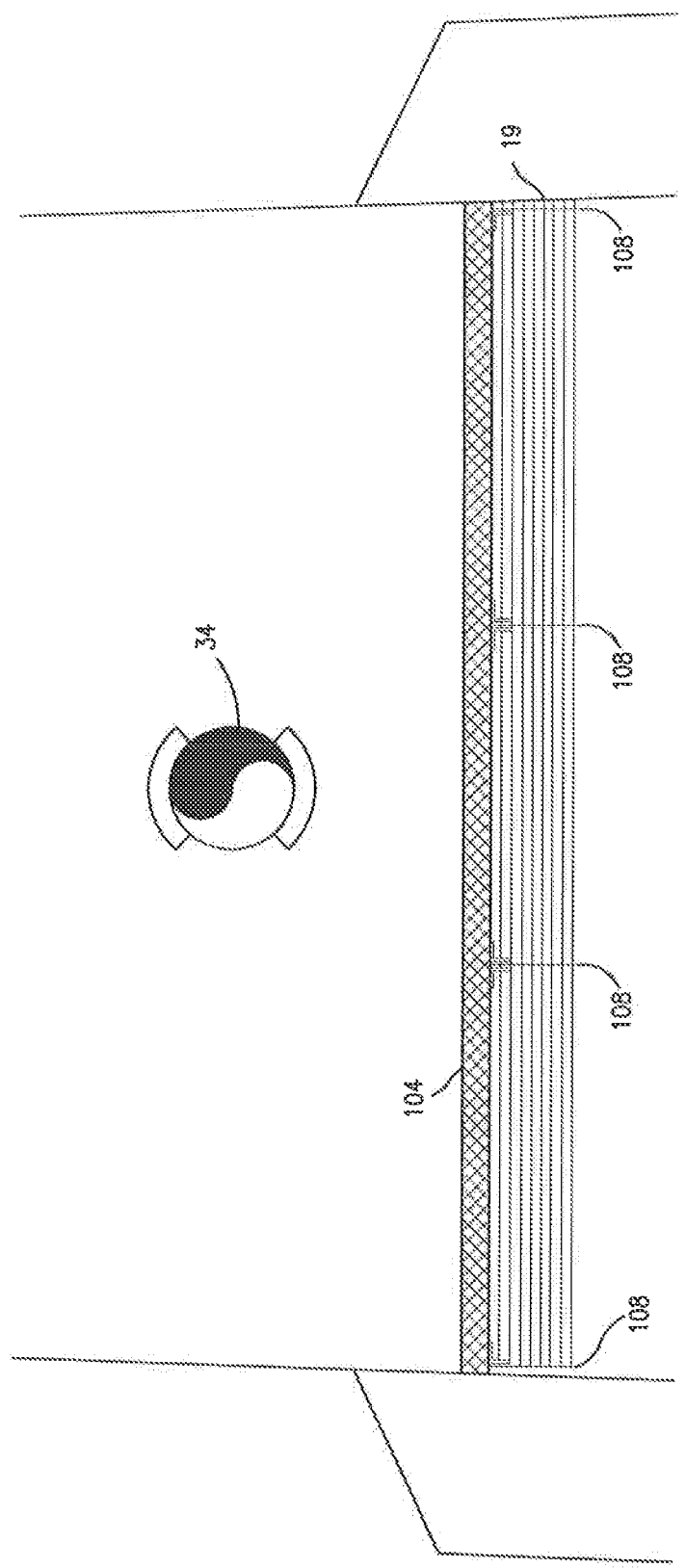

METHOD AND APPARATUS FOR COMMISSIONING POWER PLANTS

This application is division of co-pending application Ser. No. 12/056,128, entitled METHOD AND APPARATUS FOR COMMISSIONING POWER PLANTS, filed on Mar. 26, 2008, which in turn claims the priority date of Provisional Application Ser. No. 60/908,277, entitled METHOD AND APPARATUS FOR COMMISSIONING POWER PLANTS, filed on Mar. 27, 2007, which this application incorporates by reference in their entirety and for all purposes.

FIELD AND BACKGROUND OF THE INVENTION

The present invention relates to the commissioning of new and refurbished steam generation plant equipment and piping. More particularly, the present invention relates to the cleaning and conditioning of metal surfaces in the steam and water circuits associated with steam turbine generators and similar equipment at the same time that other essential commissioning activities are being performed.

Steam turbines convert thermal energy from pressurized steam into mechanical energy. This mechanical energy is commonly used to drive electric generators or gas compressors. In combined cycle power plants, the exhaust heat of a gas turbine is used to generate steam that is then used to power a steam turbine. In some types of gas turbine designs, some of the steam generated is also injected into the combustion path of the gas turbine to enhance the power output of the gas turbine.

Particulate debris may plug start-up screens installed at the inlet control valves of the turbines or clog narrow steam passages. Particulate debris may cause erosion or impact damage to both stationary and rotating components of the steam turbines. Particulate debris may also plug or damage the internal surfaces of steam valves used to control the flow of steam.

Silica oxides dissolved in steam are another critical contaminant that may be transported from the steam generation equipment and piping to steam turbines. The solubility of silica oxides in the steam is significantly increased with increasing temperatures. During the passage of steam through a steam turbine, the temperature of the steam is reduced. This will lead to a reduction of silica solubility and the deposition of silica on the internal surfaces of the steam turbine.

Another critical type of contamination that may be transported from the steam generation equipment and piping to the steam turbine are various salts. These salts include those that lead to high levels of cation conductivity in the steam condensate. Steam cation conductivity is the conductivity measured in steam condensate that has been passed through a cation exchange resin. High cation conductivity results from anions. The presence of anions in the steam will lead to the potential of stress cracking of steam turbine components. Chlorides, organic anions and sulfates in the steam pose a particular danger for the onset of stress cracking.

Other presence of other salts, such as sodium, is also monitored in the steam. The presence of sodium in the steam risks the deposition of alkalis and/or other salts. Sodium chloride and sodium hydrogen sulfate also constitute a risk of stress corrosion cracking of turbine components.

In typical prior art methods for the commissioning of new and refurbished steam turbine generator facilities, numerous methods have been employed to remove particulate contamination from the interior surfaces of the equipment and piping used to generate and transport steam to steam and gas turbines.

One such method has been practiced for many decades and involves the pressurization of the steam generator with steam followed by the rapid release of the steam through a quick opening valve. This method is typically referred to as a "high pressure discontinuous steamblow". A second method practiced for nearly the last twenty years involves the continuous discharge of low pressure/high velocity steam from the steam generators through the steam piping. This method is typically referred to as a "low pressure continuous steamblow".

Still other methods of the art involve:

(a) the chemical cleaning of the steam generator and its associated piping before the steam generator is repeatedly pressurized with high pressure air that is released through a quick opening valve. [This process is typically referred to as an "air blow cleaning"];

(b) a high velocity water flush of the steam circuits, followed by a chemical cleaning typically using EDTA followed by an extended steamblow through the steam system bypass valves to the condenser. This method is typically referred to as the "Siemens Augmented Bypass Operation"; and (c) the chemical cleaning of the steam generator, followed by the high velocity flushing of the steam path from the steam generator through the superheater, in addition to the high pressure water "hydro-milling" of the steam piping to the steam turbine. This method may also include a steamblow upon commissioning of the steam generator to the conseuser to confirm the absence of particulate contamination. This method is referred to as the "LARCOM Process".

In yet other variations of the above methods, a combination of chemical cleaning of the steam generator and mechanical cleaning of the steam piping followed by a steamblow through the plant steam bypass system to the condenser have been practiced. The mechanical cleaning of the steam piping may include the abrasive blasting of the pipe interior, hydro milling with high pressure water or other similar practices.

While all of the above prior art methods may be successful in the removal of particulate contamination from the steam generator and pipe delivering steam to the steam turbine, the above prior art methods do not integrate the cleaning practices into other commissioning activities of the plant. They do not integrate the removal of particulate contamination with the removal of other types of steam contamination such as silica, cation conductivity and salts. Further the prior art cleaning methods typically limit the scope of the particulate debris cleaning effort to the steam generator, its associated piping and the steam piping. Little if any effort is made to remove particulate and other contamination found in the condenser. In these prior art methods, the condenser may be flushed with water prior to initial operation of the steam generator. Contamination removed from the condenser may also be removed by use of condensate polishing beds following initial steam discharge to the condenser.

Many of the prior art methods rely on the chemical cleaning of the steam generator and associated piping to reduce the potential for solid particle contamination. Many of the chemical cleaning solutions contain sodium, organic acids, organic corrosion inhibitors and other salts. Past experience has shown that it requires extensive post chemical cleaning flushing to remove all residual salts that may "hide-out" in systems that have been chemically cleaned.

These residues from the chemical cleaning may add to the level of sodium, cation conductivity and salts in the steam cycle of the plant. The chemical cleaning processes also generate large volumes of waste solution and waste flush water.

Prior art methods make little effort to optimize conditions that will increase the rate of silica, elements that contribute to cation conductivity and other salt contaminants. Removal of these contaminants is typically left to the initial operation of the steam generator with steam bypassed to the condenser. The operation of a plant in steam bypass mode to the condenser is not optimized for the removal of silica and other contaminating salts in the steam. Steam bypassed to the condenser is cooled by addition of condensate to meet the design enthalpy limits of the condenser. Cooling of the bypass steam will result in the precipitation of silica dissolved in the steam. In the prior art, the clean-up of the steam condensate to remove silica and other non-particulate contamination during turbine bypass operation is out of the scope of the existing steam system cleaning practices used to remove particulate contamination. In the prior art, before steam can be discharged to the condenser through the bypass valves, the steam path must be cleaned to remove particulate contamination that may otherwise damage those valves.

Many prior art methods are also highly dependent on vigilant maintenance of the cleanliness of the systems cleaned prior to the initial operation of the steam generator. Corrosion following chemical cleaning, hydro-milling or other forms of mechanical cleaning may result in the formation of new particulate and salt contamination in the systems previously cleaned. Introduction of particulate contamination is also possible due to required mechanical work following many of the prior art multi-stage cleaning methods. Many prior art systems require extensive use of welding to close access point required for the cleaning methods. Use of corrosion inhibitors or other agents to preserve the cleaned surfaces may only exacerbate to amount of salts and organic compounds that will contaminate the steam during initial operation of the steam generator in bypass mode to the condenser.

The prior art practices of "discontinuous high pressure steamblow" and the "low pressure continuous steamblow" exhaust all steam from the steam cycle during the cleaning process, these methods require large volumes of high quality water, may take weeks to complete, and can result in environmental issues such as noise, related to the discharge of large volumes of steam. In addition, these methods do not generate conditions highly favorable to the removal of silica, elements that result in elevated cation conductivity or other non-particulate steam contamination.

These methods also do not involve the condenser and therefore do nothing to address contamination that might originate from the extensive amount of contaminated metal surface area in the condenser. These practices also require operation of the steam generator for an extended period of time with little possibility for other normal commissioning activities to be performed. The fuel consumed during such steamblow operations represents a significant expense. Extended operation of gas turbines of combined cycle power plants before tuning of the burners to minimize emissions during prior art methods also results in significant exhaust emissions.

In addition to the above, the prior art practices make only limited provisions for the assured protection of the condenser during the discharge of steam to the condenser. Specifically, none of the prior art practices make adequate provisions to prevent the continued discharge of steam to the condenser should the condenser lose coolant flow or should attemperation water used to cool the steam being discharged to the condenser be interrupted.

Prior art practices that rely on operation of the steam system in bypass mode through the bypass valve do not provide an assured means of protecting plant bypass valves from contamination or conditions that may cause the bypass valve to not close fully when plant conditions would require such closure to protect the condenser from damage. These same prior art methods make no provision to insure that the conditions generated by operation of the steam generation system in the bypass mode will optimize conditions for removal of either solid particle or other types of steam contamination due to the high pressure drop normally associated with typical bypass valves and the high back pressure of typical steam distribution sparge tubes in the condensers. Although some prior art provides for the installation of sacrificial tubes in the top layer of the condenser tube bank, none of the prior art cleaning methods provide for an assured means of shielding condenser tubes from high velocity particles or moisture droplets discharged into the condenser at high velocities.

Most prior art steam system cleaning methods do not provide for the comprehensive treatment of the steam condensate generated in the condenser during bypass mode operation. As a result, particulate contamination found in this condensate will result in the plugging of condensate and boiler feedwater pump strainers. No particulate contamination such as silica and dissolved salts are returned to the steam generators. Use of ion exchange beds to remove salt ions is expensive and is rarely applied.

Further, the prior art methods do not provide a means of cleaning the steam exhausted from the steam generator and steam piping to remove contamination prior to the admission of the steam to the condenser. Contamination transported by the initial steam discharged to the condenser will foul the condenser and may result in mechanical damage to the condenser due to the high velocity impingement of particulate contamination and entrained condensate droplets on the thin wall condenser tubing. Although some prior art methods provide for the installation of a metal target plate into the bypass steam circuit to the condenser to monitor the presence of particulate contamination, none of the prior art methods make provision for the diversion of contaminated steam away from the condenser when particulate contamination is indicated by such targets. The prior art also makes no provision for diversion of steam with high concentrations of non particulate contamination until such time as the level of contamination of the steam has been reduced to an acceptable level.

The prior art methods also make no special mechanical or chemical provisions during the operation of the steam generation equipment in bypass mode to create conditions that would enhance the removal of solid particle and other forms of steam contamination from the steam/condensate cycle.

In addition, prior art methods have not been practiced to generate physical and chemical conditions in the steam path that will insure the formation of a passive coating on the metal surfaces consistent with that formed by long term operation of the steam system at normal operating conditions.

SUMMARY OF THE INVENTION

It is therefore an object of the present invention to provide an improved method for the cleaning of steam generation equipment and piping that supply both steam and/or gas turbines with a process that is integrated into the normal commissioning sequence of a new or refurbished steam generation facility. In this manner, the normal commissioning activities of the fuel supply, combustion and combustion gas exhaust systems as well as plant auxiliary systems may be tuned in parallel to the integrated cleaning activity. It is a further object of the present invention to reduce fuel and water consumption required for cleaning and commissioning. It is a further object of the invention to integrate of the decontamination and other commissioning activities so that, the time required to complete a project is significantly reduced.

One aspect of the present invention is to integrate the process of removing particulate contamination from the steam generator and steam piping circuits to the steam turbine with the process of removing other contaminates such as silica, elements that contribute to high cation conductivity, sodium and other salts.

A further aspect of the present invention is inclusion of all elements of the steam/condensate cycle in the commissioning/cleaning process to assure that all possible sources of contamination have been involved in the cleaning process. The present invention provides for the discharge of steam to the condenser for the bulk of the cleaning process. The discharge of clean steam to the condenser for the bulk of the steam system cleaning effort washes the extensive metal surface area of the condenser at the same time that the remainder of the plant steam cycle surfaces are being cleaned.

Another aspect of the present invention is generation of enhanced conditions during the initial operation of the steam generation equipment and piping that conveys steam to the steam turbine to provide assurance that the system will be rapidly cleared of particulate contamination without the requirement for chemical cleaning of the steam generator or steam piping. This is accomplished by the operation of the steam cycle at very high velocities and "cleaning force conditions". The temporary piping and equipment provided for by this invention is designed to allow "base load" or 100% load operation of each individual steam generator. Prior art steamblow techniques are typically practiced at loads of 25 to 35% of base load or less. As a result of the higher firing rates provided for by the present invention, other commissioning activities may be performed simultaneously with the effort to clean the steam cycle of the particulate and non-particulate contamination. Operation at base load provides higher steam flow conditions and higher steam temperatures during the cleaning process. The high steam flows rates improve both the rate and effectiveness of the process to remove particulate contamination from the steam generator and steam piping. The higher steam temperatures benefit the removal of silica and other non-particulate contamination from the steam generator and piping and promote a more rapid formation of a stable passive film on the metal surfaces of the steam path to the steam turbine.

Another aspect of the present invention is to avoid the sonic restriction typically incurred by exhaust of the steam through the common blow out kits provided by the steam turbine manufacturers for the steam stop valves at the inlet to the steam turbine at the end of the steam flow path from the steam generator and steam piping. Experience has shown that these blow-out kits typically restrict the cross sectional area of the exhaust steam path creating a choke point in the steam exhaust that will typically generate a sonic flow condition in the exhaust steam path. Such a sonic restriction will increase upstream pressures and result in lower steam velocities in the steam generator superheater and steam piping. The lower velocities reduce the effectiveness and rate of system cleaning. Experience has also shown that many of the blow out kits for the turbine stop valves are not designed with materials capable of safely operating at the maximum design temperature of many of the steam systems being commissioned. The temperature limitation of a blowout exhaust kit for a steam turbine stop valve would prevent base load operation of the unit at full operating temperatures. The higher temperatures increase both the effectiveness and rate of removal of both the particulate and non particulate contamination from the steam path to the steam turbine.

To prevent the above limitations, the present invention provides for the installation of a larger exhaust nozzle on the steam piping immediately prior to the steam turbine inlet valve. This connection is designed to limit the restriction of the exhaust steam flow cross section to allow base load operation of the steam generator while minimizing the generation of backpressure from a sonic condition in the temporary steam exhaust piping.

Another aspect of the present invention is to install temporary piping of a material class suitable for steam temperatures up to the maximum design conditions of the steam at base load operation. The ability to safely operate with steam flows and temperatures up to the base load conditions improves the effectiveness and speed of removal of both particulate and non particulate contamination but also facilitate the simultaneous ability to tune steam generator burners and other equipment necessary for normal plant commissioning.

In a variation of the present invention, restriction of the low temperature rating and limited cross sectional flow area of a steam turbine manufacturer's blow kit is mitigated by the addition of a temporary means of adding condensate or boiler feedwater to the plant steam piping upstream of the blow kit. By addition of water to the high temperature steam upstream of the blow kit, the temperature of the steam is lowered within the design temperature range of the blow kit. At the high steam flow conditions generated by base load operation of the steam generators, the pressure of the steam passing through the blow kit is kept sufficiently high as to limit the adverse potential of a sonic discharge through the constricted cross sectional flow area of the blow kit.

Due to the novel steam conditioning equipment employed by the present invention, chemically treated condensate can be safely added to the high velocity steam to form an annular mist in the circuits of the steam cycle as the interior surfaces of the steam generation equipment and piping are being cleaned by the high velocity steam as the steam is being exhausted to the condenser. When condensate is injected into the superheated, high velocity steam, the water droplets will evaporate reducing the temperature of the steam. The rate of droplet evaporation is limited by the decreasing surface area of the droplets available to allow heat to be transferred from the superheated steam into the remaining condensate droplet. As a result, the droplets will persist for some period of time in a two phase flow condition of high velocity steam and entrained droplets. Scientific literature describes such a two phase flow regime as an annular mist. The annular mist condition will persist for some distance downstream of the condensate injection point due to the time required to effect the complete evaporation of the liquid droplets into the steam. Staging the injection of the condensate at various points along the steam path will assure all interior surfaces of the pipe are effectively washed by the entrained water droplets. In prior art practice, addition of condensate droplets to steam being discharged to a condenser would not be practiced due to the risk of carryover of the high velocity droplets into the condenser with the potential that such droplets, and the solid particle contamination they disengage from the steam path interior surfaces could result in erosive damage to the thin walled condenser tubes.

Entrainment of water droplets in the high velocity steam generates a more erosive condition as the high velocity steam flows through the steam path from the steam generator to the steam turbine. Impact of these high velocity water droplets on the interior metal surfaces of the steam path will more rapidly and effectively dislodge adhered solid particle contamination from the steam path surfaces. The present patent also makes provision for the removal of entrained water droplets in the steam before it is discharged to the condenser. In this manner, contamination of the condenser by the dirty steam being exhausted from the steam generator and piping is avoided. By removal of the entrained solid particle contamination and entrained water droplets from the high velocity steam entering the condenser, the present invention assures that the thin walled tubes in the condenser will not be eroded by impingement of those surfaces by high velocity particles or water droplets.

In addition to the enhanced cleaning effect of entrained water droplets exhibit to adhered solid particle contamination, the liquid water droplets impacting the interior surfaces of the steam path from the steam generator to the steam turbine also enhance the removal of silica and other non-particulate contaminants from the steam path surfaces. Due to the fact that the present invention conditions the steam exhausted to the condenser and does not require the steam to be lost to the atmosphere, volatile chemical agents may be added to the steam and the injected condensate in sufficient concentrations to create a chemical environment more conducive to the removal of silica and other non-particulate contamination found on those surfaces.

The addition of ammonium hydroxide in sufficient concentration to increase the pH of the steam above 10.0 and preferably above 10.5 significantly enhances both the rate and effectiveness of silica solubility into the cleaning flow of steam. The high pH and the presence of the liquid water droplets further reduces the potential for the silica and other salts to redeposit onto the steam path surfaces or onto the surfaces of the condenser tubes. Use of high pH condensate to wash the steam in the steam conditioning equipment prior to the condenser also helps to reduce the amount of non-particulate contamination that is discharged to the condenser.

Due to the much more aggressive flushing conditions generated by the steam and the two phase steam/condensate flows at the higher steam production rates facilitated by the current invention, the requirement for chemical cleaning of the steam superheater surfaces and steam piping is eliminated. As a result, potential sources of residual non-particulate steam contamination from the chemical cleaning are minimized in addition to eliminating the cost and disruption of the chemical cleaning activity to the commissioning schedule, the cost and environmental impact of the chemical cleaning waste disposal, the requirement for extensive flushing following the chemical cleaning and the need to vigilantly maintain chemically cleaned systems to prevent corrosion and recontamination between the time the chemical cleaning has been performed and the steam generator and steam piping are put into service.

Another aspect of the present invention is to limit the amount of high quality water that will be consumed during the cleaning and commissioning efforts. The elimination of the chemical cleaning and post chemical cleaning flushes reduces the amount of water consumed by those practices. In addition, the present invention provides for the recovery of a vast majority of the steam used to purge the steam path of contaminants by means of washing the contaminated exhaust steam prior to its admission to the condenser and by treatment of the condensate returned from the condenser. Reduction of water consumption during the commissioning phase of a new or refurbished steam turbine facility reduces cost and facilitates the plant commissioning schedule in situations where the supply of high quality make-up water is limited.

A further aspect of the present invention is to provide enhance protection of the condenser during the initial discharge of steam to the condenser. The present invention provides for the use of a soft metal target inserted into the exhaust flow from the steam conditioning equipment used to treat the exhaust steam prior to discharge of the steam to the condenser to assure that steam flow to the condenser is properly conditioned and free of all erosive solid particles and entrained water droplets. In addition, the present invention provides for a novel means of monitoring both the influent and effluent of the steam conditioning system to assure that both particulate and non-particulate contamination is removed from the exhaust steam prior to the admission of the steam to the condenser.

During the initial discharge of steam from the plant steam circuits, the present invention provides for a diversion means to discharge highly contaminated steam to the atmosphere instead of the condenser. Polished metal targets are inserted into the inlet and outlet of the exhaust steam conditioning equipment disclosed in this invention. A comparison of these targets provides assurance that all harmful particulate contamination is removed from the exhaust steam prior to the discharge of any exhaust steam to the condenser. In addition, steam condensate samples are taken from both the inlet and outlet of the exhaust steam conditioning equipment. Analysis of this condensate allows the concentration of silica and other non particulate contaminants to be monitored while steam is initially diverted from the condenser to the atmosphere. Only after comparison of the polished metal targets at the inlet and outlet of the exhaust steam conditioning equipment and the chemical analysis of the steam condensate from both the inlet and outlet of the exhaust steam conditioning equipment demonstrates that the steam cleanliness is sufficient to allow safe discharge of exhaust steam to the condenser is the steam diverted away from the atmospheric discharge and allowed to enter the condenser.

Another aspect of the present invention is the modification of the existing bypass steam system to allow steam discharge to the condenser under conditions more favorable to the overall cleaning process as well as to reduce the energy of the steam discharged to the condenser. The present invention provides for the installation of a modified steam diffuser in the condenser to reduce the backpressure of the steam entering the condenser. By substantially reducing the backpressure on the steam entering the condenser, higher velocities are achieved in the plant piping and steam generation equipment. Reducing the backpressure of the steam entering the condenser also lowers the design pressure of the temporary piping and steam conditioning equipment.

In addition the present invention also provides for the installation of a porous impingement shield between the diffuser and the top surface of the thin walled condenser tubes. The impingement shield provides a tortuous path for the steam and any entrained particles and droplets that may still enter the condenser despite the effect of the steam conditioning equipment provided for by the present invention. In addition to acting as an impingement surface to spoil the velocity of any solid particles or water droplets that may be entrained in the steam entering the condenser, this shield also acts to more uniformly distribute the steam within the condenser. The combined effect of these measures is to reduce the potential for solid particle and high velocity water droplet impingement on the thin walled condenser tubes, and the potential of damage to condenser tubes as the result of localized heating or excessive vibration of condenser tubes due to the poor distribution of high energy steam into the condenser.

Another aspect of the present invention provides specially designed temporary equipment to assure that steam flow to the condenser may be rapidly terminated when conditions occur that may expose the condenser to potential damage. Should cooling water flow to the condenser be lost, serious damage to the condenser tubes and tubesheets will occur in a short period of time due to the overheating of the condenser tubes. Such an occurrence may also result in the failure of the condenser rupture plate due to an excessive pressure in the steam chest of the condenser. An overtemperature condition may also occur with the loss of the quench and wash water flow into the exhaust steam. In such an event the temperature of the steam will quickly rise above the design limits of the condenser.

The present invention provides for a set of rapidly actuated valves that will divert exhaust steam from the path to the condenser and simultaneously open the discharge of the steam to an atmospheric vent. The actuators of these valves are provided a secure source of power to assure operation of the valves even in the event of a plant power failure. The combined effect of these valves also provides a means of protecting against a sudden increase in the operating pressure above the design pressure of the temporary piping and the steam conditioning equipment. The present invention also provides for the installation of a redundant overpressure protection means that will automatically discharge steam to the atmosphere should the operating pressure of the temporary piping and steam conditioning equipment exceed the designed operating pressure of these systems.

Another objective of the present invention is to provision of a method and means to remove particulate and other non-particulate contaminates from the steam cycle in a highly efficient manner. Experience has shown that the initial steam exhausted from new or refurbished steam generation equipment and piping will contain very high concentrations of both solid particle and non-particulate contamination. In the present invention, this initial steam exhaust is passed through the steam conditioning equipment where the steam is washed with condensate and then the dirty liquid condensate is separated from the treated exhaust steam. The equipment provided for by this invention allows this washed steam to be discharged to the atmosphere as it may still contain some contamination. During this initial phase of the cleaning cycle, the steam wash effluent from the separator section of the steam conditioning equipment is channeled to waste. This wash water effluent is tested to determine the concentrations of both suspended and dissolved contamination. A soft metal target is also inserted into the steam exhaust from the steam conditioning equipment. This initial orientation of the system is continued until the level of contamination in the steam wash water effluent and the appearance of the soft metal target in the steam effluent from the conditioning equipment indicate that the exhaust steam cleanliness is adequate for discharge to the condenser. In addition, the present invention provides for the continued washing of the exhaust steam through the duration of the cleaning process and the continued monitoring of the cleanliness of the steam entering and exiting the steam conditioning equipment.

The present invention also provides for the interception of all of the condensate from the condenser hot well before it is returned to the steam generation equipment. Experience has shown that the initial condensate from the condenser will have high levels of particulate and non-particulate contamination. Initially the intercepted condensate is segregated and discharged to waste. During this initial period, the present invention provides for the temporary supply of clean condensate to the steam generation equipment. Once testing of the condensate returned from the condenser indicates that the heaviest concentrations of contamination are beginning to wane, the present invention provides for the treatment of the condensate collected in the condenser to make the condensate suitable for return to the steam generation equipment. The treatment of the condensate includes passage of the condensate through a set of filters with a designed flow capacity sufficient.

The considerable amount of metal surface in the condenser provides a significant source of both particulate and non-particulate contamination to the steam cycle. Prior art practices have not provided for the treatment of the initial full flow of condensate to adequately remove this contamination from the condensate returned from the condenser. The suction strainers on the plant condensate pumps typically are not fine enough to remove a significant amount of particulate contamination from the condensate returned from the condenser. The design of the normal plant condensate suction strainers is also inadequate to have the capacity to remove a significant quantity of contamination before the suction strainer is plugged and the condensate pump must be removed from service. In many cases, it is common for the plugging of condensate pump strainers to result in an unplanned shut-down of the plant resulting in a disruption and delay of the plant commissioning effort. Operation of the plant condensate pumps without adequate protection from the detrimental ingestion of particulate contamination by the condensate pumps risks damage to these pumps as well as the plugging or damage to flow control valves in the condensate and boiler feedwater piping. The passage of excessive quantities of particulate contamination from the condenser into the condensate and feedwater piping also risks the potential for the plugging of the suction strainers of the boiler feedwater pumps. Again it is a common experience that particulate contamination collected in the boiler feedwater pump suction strainers will cause the boiler feedwater pumps to cease operation with the result that an unplanned outage of the plant during commissioning will occur.

In addition to the use of fine filters to remove solid particle contamination, the present invention provides for temporary pumps specifically design to pull suction from the condenser hotwell and discharge the dirty condensate to the filters. These pumps are designed to draw suction into the pump to overcome the low net positive suction head generated by the vacuum of the condenser. These pumps are also designed with adequate clearance to allow passage of particulate contamination without damage to the temporary pump. The temporary condensate pumps may also be equipped with multiple suction strainers to allow the continuous operation of the temporary pump even though solid particle debris has collected in one of the suction strainers.

In addition to the filters, the condensate may also be treated by passage through ion exchange resin beds or other types of water treatment equipment to remove dissolved salts and silica from the condensate.

Another aspect of this invention is provision of a means for the treatment of the effluent condensate from the steam conditioning equipment. Experience has shown that after some period of time the cleanliness of the steam exhausting from the steam generation and steam pipe path to the steam turbine will substantially improve. Although the cleanliness of this steam is still insufficient to warrant termination of the cleaning effort, the steam conditioning wash condensate is sufficiently clean to allow this effluent to be treated to make it suitable for return to the steam generation equipment. By providing for the treatment of the steam conditioning equipment wash effluent, the present invention further reduces the amount of water consumed by the cleaning program.

Another aspect of the present invention is protection of the steam turbine by the installation of a supplemental means of cooling the exhaust hood of the steam turbine that is common to the inlet to the condenser. When steam is exhausted to a condenser that is in communication with the steam turbine, it is normal practice for the steam turbine rotor to be rotated to insure that the rotor is uniformly heated by any steam with which it may come in contact. Injection of supplemental condensate spray into the steam turbine exhaust hood beyond that normally provided by the plant design insures that the prolonged discharge of steam to the condenser will not result in the differential heating of the steam turbine rotor and casing. Localized heating of the rotor at a rate or to an extent that results in the differential expansion of the rotor compared to the casing may result in an interference between these two steam turbine components. Such an interference or rub may prevent the continued rotation of the steam turbine rotor. In such an event, continued discharge of steam to the condenser would need to be terminated to avoid the potential for the uneven heating of the steam turbine rotor. An uneven heating of the steam turbine rotor could result in the bending of the steam turbine rotor shaft. Normal plant designs provide for the injection of condensate into the exhaust hood of the steam turbine. In the present invention, the plant hood spray system may be supplemented by an additional system of condensate sprays to assure the continued addition of large volumes of exhaust steam into the condenser without the differential heating of the steam turbine components.

Another aspect of the present invention is generation of conditions during the combined cleaning/commissioning of the steam generator and steam path so as to generated a highly passive condition on the metal surfaces of the steam path consistent to that generated during normal operation of the steam systems. The present invention accomplishes this by operation of the steam path at the elevated temperatures achieved at the higher load rate as well as by the addition of volatile chemical agents that will effectively generate such a passive surface rapidly during the combined cleaning and commissioning activity described by this present invention.

Another aspect of the present invention is the provision for temporary condensate storage, pumps and piping to provide a secure source of condensate to the plant and temporary equipment even though the normal plant system may no longer be available for service. It is not uncommon during the commissioning of a new or substantially refurbished plant for the power supply system of the plant to suffer an unexpected outage. To prevent damage to plant equipment due to the sudden loss of condensate required to control the steam temperature, the present invention provides for sufficient condensate storage, pump capacity and piping to provide such condensate flow as necessary to support temperature control of the steam up to the base load condition of the plant. To insure that power to the temporary pumps is not lost in the event of a temporary plant power failure, the temporary pumps may be driven by a diesel engine or by electric motors powered by temporary diesel generators.

Another aspect of the present invention is provision of a separate means of overpressure protection on the steam conditioning equipment and the temporary piping to provide assurance that an incorrect operation of the temporary valves used to direct the steam during the cleaning and commissioning effort cannot result in the a condition wherein the designed operating pressure of the temporary steam conditioning equipment and temporary piping is exceeded.

The above and other objects and aspects of the present invention will become apparent from the drawings, the descriptions given herein, and the appended claims.

In one embodiment, the present invention provides for the washing of the interior surfaces of the steam path at steam production rates that allow initial tuning of the "Dry Low NOx" (DLN) burners of a gas turbine and/or the performance of a required extended period of base load operation of the gas turbine to allow removal of the start-up strainers from the gas supply piping to the gas turbine burners.

Due to the high rates of steam production during the extended time required to complete these normal commissioning activities of a gas turbine combined cycle power plant, the prior art methods that exhaust steam to the atmosphere are not practical as a result of the large amounts of high quality make-up water required. In the prior art methods that call for the discharge of exhaust steam to the condenser, the use of the normal steam bypass system to divert the steam prior to the steam turbine entry limits the cleaning conditions due to the higher backpressure of the normal bypass systems. These latter prior art methods also require extensive chemical and mechanical cleaning methods prior to the use of the plant bypass systems. In addition, passage of steam through the normal plant bypass systems risks potential damage to the bypass valves and to the thin walled condenser tubing.

Past experience has shown that the passage of contaminated steam through the bypass valves risks damage to these valves to the extent that they may be unable to close completely in the event that plant conditions require the termination of steam flow to the condenser. In such cases, the condenser may incur serious damage by the continued uncontrolled discharge of steam to the condenser. Also the prior art methods do not provide means to protect the thin walled tubes of the condenser from potential damage due to debris or entrained water droplets in the steam entering the condenser.

In this embodiment of the invention, the steam is initially discharged to the atmosphere to a temporary start-up silencer. The path of the steam to the atmospheric silencer passes through a rapid opening valve that is designed to fail in the open position.

In this embodiment of the invention, the rapid opening valve is actuated by a pneumatic cylinder. The air supply to this pneumatic cylinder is a temporary air storage accumulator that is isolated from other plant system in such a manner as to provide assurance that sufficient air pressure and volume will be always available to actuate the exhaust valve into the open position.

In this embodiment, during the initial generation of the dirtiest steam from the steam generator and steam piping, the most highly contaminated steam is exhausted from the system to the atmospheric silencer. This initial period of steam discharge is typically coincidental to the initial full-speed-no-load operation of the gas turbine. In this embodiment of the invention, both plant condensate storage and the temporary condensate storage tanks and pumps provided for by this invention are used to maintain a sufficient flow of make-up condensate to the steam generation equipment while the highly contaminated steam is being discharged to the atmosphere.

The present invention also provides for the addition of sufficient condensate into the exhaust steam to generate a condition where the steam is supersaturated with water droplets. Through the intimate contact of the water droplets with the steam, the steam temperature will be greatly reduced resulting in a significant reduction of the solubility of silica in the steam. The entrained water droplets will also agglomerate with particulate particles entrained in the exhaust steam flow. Salts that are also soluble in the steam will be washed from the steam by the entrained water droplets. Following the washing of the steam, the present invention provides for the passage of the steam through a coalescer that will hold up the entrained dirty water droplets to facilitate the separation of the contaminant laden water droplets from the steam by means of a cyclonic separator. The combination of a steam wash means, by the injection of excess condensate into the high velocity, high temperature steam; the passage of the washed steam through a coalescer means, to hold up the wash water effluent droplets, slowing their velocity and increasing their size as well as reducing the turbulence of the steam and a cyclonic separator means to separate the entrained wash condensate effluent from the exhaust steam is called the "steam conditioning equipment".

The function of the cyclonic separator is enhanced by the design and presence of the coalescer in the flow path immediately prior to the entrance of the cyclonic separator. The extended surface of the coalescer, the increased steam flow cross section and the reduced flow path wetted diameter through the coalescer have the effects of slowing the water droplets entrained in the steam flow, increasing the droplet diameters and reducing the turbulence of the steam as it passes through the coalescer. These conditions improve the ability of the cyclonic separator to effectively remove the entrained wash condensate droplets from the steam flow.

In this embodiment of the invention, the cleanliness of the steam entering the steam conditioning equipment is monitored by the insertion of a polished metal target into the inlet steam. The cleanliness of the inlet steam is also measured by the analysis of the effluent wash condensate from the cyclonic separator. A high concentration of particulate and non-particulate contamination in the wash condensate effluent is an indication of the amount of contamination entrained in the inlet steam.

Further, in this embodiment of the invention, the cleanliness of the steam leaving the cyclonic separator, prior to its discharge to the atmospheric silencer, is also monitored by the insertion of a soft polished metal target at the outlet of the cyclonic separator. The impact of entrained solids or water droplets on the soft polished surface of the target would indicate that the exhaust steam is of insufficient cleanliness to allow its discharge to the condenser. An unblemished polished target exposed to the exhaust steam flow would indicate that the steam cleanliness is suitable for discharge to the condenser.

In addition to the above, a sample of the steam effluent from the steam conditioning equipment can also be passed through a condenser coil. The condensate sample produced by this condensing coil can then be analyzed for the presence of non-particulate salts and silica.

In this embodiment, while the initial steam generated is vented to the atmosphere, steam may be introduced to the shaft seals of the steam turbine and a vacuum established in the condenser in preparation for the introduction of steam to the condenser. In many cases, the normal plant design will provide for an auxiliary boiler that may be used to first clean the steam path to the steam turbine shaft seals and then to provide the necessary steam to those seals. Such an auxiliary boiler may also be used to provide motive steam to the steam jet ejectors that are typically used to remove non-condensable gases from the condenser and establish the necessary vacuum to allow for the safe operation of the condenser.

In other cases where an auxiliary boiler is not provided for by the normal plant design, a temporary boiler may be used to provide the necessary seal steam and motive steam for the air removal from the condenser.

In still other cases, a mechanical vacuum pump provided for by the plant design or a temporary mechanical vacuum pump obtain for the commissioning may be used to generated the vacuum in the condenser required for the safe operation of the condenser.

In yet other cases the steam generated by the steam generator may be used to perform a service blow cleaning of the steam piping to the steam jet ejectors and the steam turbine gland steam supply piping. Once these lines have been blown clean, steam from the steam generator may be used to provide the motive steam for the steam jet ejector equipment to generate the necessary vacuum on the condenser and to provide seal steam to the steam turbine.

In still other cases, a separate high pressure steam conditioning unit may be used to clean sufficient steam to provide sufficient clean steam from the steam generator to provide the necessary steam for the required seal steam flow to the steam turbine shaft seals.

Once the testing of the steam exhausting the steam conditioning unit indicates that the steam is sufficiently clean to be discharged to the condenser, a warm-up valve is partially opened establishing a flow of steam from the exhaust of the steam conditioning unit through temporary piping into the condenser.

In this embodiment, to establish a passage for the washed exhaust steam to the condenser, temporary piping is run to connect the outlet of the steam conditioning equipment to the condenser. To distribute the exhaust steam into the condenser the temporary piping may be connected to the inlet of the normal plant bypass diffuser. If, as is normally the case, the sum of the cross sectional area of the perforations in this diffuser is too small to allow a low back pressure on the steam conditioning equipment, the diffuser will be modified to add additional open area on the diffuser. In other cases, an additional temporary diffuser with greater open area may be used either in place of the normal plant bypass diffuser or as a supplement to the normal plant diffuser. In other cases the steam conditioning equipment can be designed to be operated at higher a pressure to match the existing design pressure drop of the plant steam sparge tube. In any case, the backpressure from the discharge of the steam through the diffuser at base load conditions of the gas turbine will be low enough to allow sufficiently high steam velocities in the steam circuit to generate cleaning force conditions in excess of 120% of those generated at normal base load conditions.

In this embodiment, a porous shield material would also be installed in the condenser between the steam exhaust points on the diffuser and the exposed surface of the thin walled condenser tubes. In this embodiment the shield material consists of woven wire mesh secured to an expanded metal support sheet secured above the banks of condenser tubes. This shield layer would be arranged in such a manner as to require the steam flow into the condenser to pass through the porous shield before the steam could directly impact the surfaces of the thin walled condenser tubes. The woven wire, or other form of perforated porous media, would have sufficient thickness to assure that any debris or water droplets entrained in the steam discharged to the condenser would first have to impinge on the porous media before striking the thin walled tubes. The effect of this porous media is to prevent the high energy impingement of entrained particulate contamination or water droplets onto the surfaces of the thin walled condenser tubes. The thickness of the shield material is preferably sufficient as to generate a few inches of water column pressure drop on the steam as it passes through the porous shield material. In this way, the shield material will also act to supplement the diffuser to assure a more uniform distribution of the exhaust steam within the condenser. The more uniform distribution of the steam within the condenser will reduce the potential for locally high flows of steam across a few tubes. By a more uniform distribution of the steam the potential for damaging localize heating of the condenser tubes or the generation of flow induced vibration of the thin walled tube is mitigated.

In this embodiment of the invention, once the temporary lines to the condenser have been warmed by the steam, the flow of steam to the condenser may be increased by further opening the warm-up valve to the condenser. Experience has shown that the pressure of the steam chest of the condenser will increase somewhat with the initial introduction of steam to the condenser. By slowly introducing and then slowly increasing the flow of exhaust steam to the condenser, the condenser air removal system will be able to control the condenser pressure within the normal design limits.

In this embodiment, once a continuous flow of steam to the condenser has been establish, a rapid opening valve between the exhaust of the steam conditioning unit and the condenser is opened. In this embodiment of the invention, the path of steam to the condenser passes through a rapid closing valve that is designed to fail in the closed position. In this embodiment of the invention the actuator on this valve is a pneumatic cylinder that is also powered by a secure supply of compressed air from a temporary air accumulator with sufficient volume and pressure to assure the actuation of this valve into the closed position should it become necessary to quickly terminate steam flow to the condenser.

In this embodiment of the invention, once the quick closing valve on the flow path from the outlet of the steam conditioning unit has been opened the warm-up valve to the condenser from the steam conditioning unit will be closed.

Once the steam flow path from the exhaust of the steam conditioning unit to the condenser is established, the rapid opening valve from the exhaust of the steam conditioning unit to the atmospheric silencer will be closed. In this embodiment of the invention, this rapid opening valve is also provided with a warm-up valve. This warm-up valve on the piping from the steam conditioning unit to the atmospheric silencer will be fully opened prior to the closing of the rapid action valve on the flow path from the exhaust of the steam conditioning unit to the atmospheric silencer. In this embodiment of the invention, the opening of this warm-up valve prior to the closing of the rapid actuation valve mitigates any sudden change in steam flow to the condenser.

In this embodiment of the invention, the warm-up valve from the outlet of the steam conditioner to the atmospheric silencer is slowly closed once the rapid actuator valve to the silencer is closed. The warm-up valve to the silencer is left partially open to maintain a sufficient flow of steam to the silencer to prevent the accumulation of steam condensate in this flow circuit.

In this embodiment of the present invention, the target assembly and steam sample point on the exhaust piping of the steam conditioning unit are positioned in such a manner that they will still be functional for the monitoring of the exhaust of the steam conditioning unit while the steam is discharged to the condenser.

In this embodiment of the invention, the steam cleanliness exhausting the steam conditioning unit will continue to be monitored during the discharge of steam to the condenser. Any indication of an unacceptable level of contamination in the steam would result in the diversion of the exhaust steam from the condenser back to the atmospheric silencer.

In this embodiment of the invention, the control circuit for the solenoids that provide compressed air to the rapid actuation valves is configured to cause the valve to the condenser to close on loss of plant power and the rapid actuated valve on the steam flow path to the atmospheric silencer to open. This control circuit may also be configured to automatically actuate the temporary steam flow control valves in the event that the flow of cooling water flow to the condenser is lost, the steam temperature or pressure to the condenser exceeds a preset limit or the flow and/or pressure of the condensate used to cool the steam being discharged to the condenser drops below a preset limit. In this embodiment of the present invention, the rapid actuated valves may also be operated by a manual switch or button should the operators determine that steam flow to the condenser must be rapidly terminated.

Once the steam flow to the condenser has been established, condensate will begin to accumulate in the hotwell of the condenser. Experience has shown that the condensate accumulated from the initial steam wash of the condenser tube surfaces will be highly contaminated with both particulate and non-particulate contamination. In this embodiment of the present invention, one or more temporary pumps are connected to the hotwell to allow the condensate collected in the hotwell to be extracted. The operating condition of the condenser under a vacuum requires that these pumps have the capability of handling sufficient condensate flow to support a sufficient flow of steam condensate to provide for a substantial steam wash of the condenser tubes. To accomplish this these pumps must also have the capability of operating at the required flows with very low net positive suction head. In the present embodiment of this invention this is accomplished by means of large diameter, centrifugal pump. The net positive suction head to these pumps may be increased by the addition of a flow inducing nozzle in the hotwell oriented to the suction of the temporary condensate pump. This water supplied to this nozzle is supplied from the high pressure discharge of the plant condensate pumps. The momentum of the high velocity water exiting this nozzle is transferred to the water at the suction inlet to the temporary pump, increasing the velocity head of the water entering the temporary pump suction.

The low net positive suction head operation of these temporary hotwell condensate pumps may also be improved by installation of a mechanical flow inducer on the pump impeller and by use of larger pumps operating at low rpm.

In this embodiment of the present invention, the impeller and casing design of the temporary condensate pump is such that the pump(s) are highly tolerant of particulate contamination. In addition in this embodiment of the present invention, the suction piping to these temporary condensate pumps may be equipped with a duplex strainer of large mesh. These strainers are configured to allow one strainer to be cleaned while the temporary condensate pump(s) continue to operate by means of the second strainer.

In the present embodiment of the invention, the temporary discharge piping from the temporary condensate pumps installed to take suction from the condenser is initially routed to waste. The initial condensate that is highly contaminated with both particulate and non-particulate contamination is exhausted from the steam cycle. The same temporary condensate storage tanks and pumps used to make-up sufficient condensate flow to the steam generator will continue to supply the required condensate flow to support the operation of the steam generator while the highly contaminated condensate from the condenser is discharged from the steam cycle.

Experience has shown analysis of the condensate from the initial steam wash of the condenser will show that after a short period of time the levels of both particulate and non-particulate contamination will begin to rapidly decrease. In the present embodiment of the invention, once the levels of contamination drop to a level that make condensate treatment practical, the discharge of the condensate pumps taking suction from the condenser hotwell are aligned to a set of filters that will remove particulate contamination larger than 20 microns from the condensate. By removal of larger particle contamination from the condensate, plugging of critical condensate and boiler feedwater valve trim is prevented. Removal of the larger particles also prevents excessive fouling of the condensate and boiler feedwater pump suction strainers. Removal of the large particles also prevents fouling of ion exchange resin beds or other water treatment equipment that may be used to further treat the condensate to remove non-particulate contamination.

As the flow of cleaned condensate from the condenser hotwell is established, the flow of condensate from both the plant condensate storage system and the temporary condensate storage and pumping system provided to make-up sufficient condensate flow until the return condensate from the condenser is available for use will be removed from service. The temporary condensate storage tank and pumping capacity will be maintained in such a manner as to provide an immediate supply of condensate to the steam wash and exhaust conditioning equipment should the normal plant systems fail for any reason. In the present embodiment of the invention, this is accomplished by continuing the operation or the temporary make-up condensate pumps in a minimum flow configuration with a check valve between the discharge header of the temporary condensate make-up pump(s) and the normal higher pressure discharge header of the plant condensate system. In this manner, with the failure of the plant condensate system for any reason, the discharge pressure of the temporary condensate make-up pump(s) will overcome the check valve and supply needed condensate to the critical steam temperature services. To assure the continuous operation of the temporary condensate make-up pump(s), at least one of the make-up pump(s) will be powered by a diesel engine driver or an electric motor powered from a secure power supply separate from the plant electrical system.

In the current embodiment of the invention, once the flow of condensate from the condenser has been established the load on the gas turbine may be increased. Experience has shown that the flow of steam condensate from the condenser can be typically achieve by the time the normal commissioning activities at full-speed-no-load of the gas turbine and the initial synchronization checks of the gas turbine at low loads are complete.

Once the load on the gas turbine is increased to allow for the normal commissioning of the gas turbine, the steam flow to the condenser will increase proportionally.

Experience has shown that once the steam flow from the steam generator and steam piping reach significant levels (at a gas turbine load of 20% or greater), the cleaning effectiveness of the steam flowing through the steam generator superheater and the steam piping will be enhanced by the injection of chemically treated condensate into the high velocity steam flow. As previously described, the injected condensate will form an annular mist flow regimen inside the steam path from the steam generator to the connection point of the temporary piping near the steam turbine inlet. The beneficial effect of this condensate injection is monitored by the target sample at the inlet of the steam conditioning unit as well as the analysis of the effluent wash water from the steam conditioning unit. The injection of the chemically treated condensate into various points in the system is continued from different injection points along the steam path between the steam generator and the temporary connection point at the steam turbine. From the temporary connection point at the steam turbine the dirty exhaust steam is routed by temporary piping to the steam conditioning unit. Prior to the entrance of the dirty exhaust steam to the steam conditioning unit, the steam is sampled to monitor the cleanliness of the steam exhausting the steam path. A polished metal target is used to determine the presence of particulate contamination that may be entrained in the exhaust steam. A steam sample is also condensed by means of a sample cooler and the steam condensate analyzed for the presence of silica, ions that elevate the cation conductivity and other salt contamination in the exhaust steam.

Experience has shown that with operation of the steam generator at the higher loads experienced during the burner tuning of the gas turbine, higher steam temperatures and steam flows are experienced. With each successive increase in load, the concentration of solid particle and non-solid particle contamination in the exhaust steam is achieved. Experience has also shown that the addition of the chemically treated condensate into the high velocity steam also has the effect of increasing the concentration of contamination measured in the exhaust steam prior to the steam conditioning unit. Experience has also shown that with time at the highest steam flow and temperature conditions, and after successive cycles of chemically treated condensate injection into the high velocity steam, the concentration of contamination in the exhaust steam will begin to decline. The simultaneous activities of gas turbine burner tuning and the removal from the steam path of both particulate and non-particulate contamination is continued until the steam sample analysis indicates that the steam exhaust meets the both particulate and non-particulate steam cleanliness requirements established for this stage of the commissioning for the steam path through the steam generator and steam piping to the steam turbine.

Past experience has shown that the exhaust steam from the steam generator and steam piping will be effectively clean by the time the burner tuning of the gas turbine is complete and the continuous base load operation of the gas turbine for the flushing of the gas supply lines to the burners is begun. During the extended base load operation period, the addition of chemicals to the steam and condensate will continue to further enhance the removal of silica and other non-particulate salt contaminates. The chemical treatment of the steam is also adjusted to generate a highly passive surface condition on the metal surfaces of the steam path. The passivation of the steam path is accomplished by the addition of a volatile oxygen scavenger compound and a volatile pH adjustment compound to the steam and condensate.

The ability to facilitate the simultaneous tuning of the gas turbine burners up to base load operation and the decontamination of the steam cycle of both particulate and non-particulate contamination is the result of the application of the steam conditioning equipment that washes the contaminated exhaust steam with clean condensate prior to the discharge of that condensate to the condenser. Without the steam conditioning equipment, the condensate and entrained particulate and non-particulate contamination would be carried over into the condenser resulting in potential damage to the condenser as well as the potential deposition of the contamination onto the metal surfaces of the condenser. This process of the present invention is also facilitated by the temporary equipment employed to treat the full flow of the condensate generated by the steam condensation in the condenser to remove particulate and non-particulate contamination that has been liberated from the condenser surfaces by the steam flush of the condenser.

The level of cleanliness of the steam cycle uniquely achieved by the present invention is further facilitated by the operation of the gas turbine up to its base load firing rate. The firing rate of the gas turbine made possible by the preset invention is four to five times greater than that typically employed by previous steam cleaning processes that do not provide for the recovery of the exhaust steam in the condenser. The higher steam temperatures and flows that are made possible by the present invention accelerate the process of decontaminating the steam path of both particulate and non-particulate contamination as well as to facilitate the simultaneous passivation of the steam path metal surfaces.

The present invention also provides for the decontamination and passivation of the metal surfaces of the condenser and a means of removing the contamination generated from the steam flushing of the condenser.

The present invention also provides for several unique means to prevent potential damage and potential fouling of the condenser metal surfaces. The steam conditioning equipment removes particulate and non-particulate contamination from the exhaust steam prior to the introduction of the exhaust steam to the condenser. The temporary measures provided for by the present invention also allow for the exhaust of the most highly contaminated steam first generated by the steam generator as well as a system to monitor both the particulate and non-particulate contamination levels at both the inlet and outlet of the steam conditioning equipment prior to the admission of steam to the condenser. These temporary measures also provide a means to rapidly isolate steam flow from the condenser should conditions arise that would cause potential damage by the continued discharge of steam to the condenser. The present invention temporary measures also provide for separate overpressure protection of the temporary exhaust steam conditioning equipment and piping.

In this embodiment of the invention, the amount of high quality water consumed during the commissioning of the steam system is significantly reduced by the recovery of the vast majority of the steam condensate. Once analysis of the exhaust steam shows that the levels of contamination have been significantly reduced, the steam conditioning wash condensate effluent may also be returned to the condenser hotwell to facilitate its treatment along with the condensate generated in the condenser.

In a second embodiment of the present invention, a steam generator fired with poultry liter on a grate and with an air cooled condenser may be commissioned in a similar fashion. In this embodiment of the invention, the cleaning of the steam path of both particulate and non-particulate contamination is achieved at the same time that the fuel handling and fuel gas treatment equipment of the plant are being commissioned.

In the prior art, the steam path through the steam generator and steam piping was typically cleaned separately from the commissioning of the solid fuel handling systems and the flue gas treatment systems. The required steam flushing of the air cooled condenser was also performed as a separate operation.

In this embodiment of the present invention, all of these activities are accomplished at the same time. In this embodiment of the present invention, the temporary steam exhaust piping is designed to provide for the initial venting of the first highly contaminated steam generated to the atmosphere. As previously described, while the initial steam production is vented to the atmosphere, a vacuum is pulled on the condenser. In this type of a plant, the initial steam production is typically accomplished by the firing of the steam generator using natural gas or propane. Due to the cost of these auxiliary fuels relative to the solid fuel specified for this type of plant, it is highly beneficial to increase the firing rate sufficient to allow commissioning of the solid fuel system.

Once the cleanliness of the exhaust steam has improved sufficiently to allow its discharge to the condenser, the steam flow is diverted from the atmospheric vent to the condenser in a similar fashion to that previously described. After the steam exhaust has been diverted to the condenser, the firing rate of the steam generator may be increased to the point that solid fuel firing may be commenced and the use of the auxiliary fuels terminated. From this point forward the solid fuel handling system and flue gas conditioning equipment may be tune up to the base load firing condition.

In this embodiment of the present invention, chemically treated condensate is also injected at multiple points along the steam path to the steam turbine in sufficient quantities as to generate an annular mist flow condition. The exhaust steam discharged to the condenser in this embodiment is also tested for solid particle and non-solid particle contamination as in the previous embodiment.

Due to the ability of the present invention to capture and return the steam condensate used to flush the steam circuits of the plant, it is feasible to add sufficient volatile chemicals to the steam cycle during the contamination removal process of this invention to significantly enhance the rate and degree of system cleanliness without the discharge of high concentrations of the treatment chemicals to the atmosphere.

It is well known, for example, that the solubility of silica in steam is significantly increased as the pH of the steam is increased. To increase steam condensate pH from 9.0 to 10.0, the ammonia concentration in the steam must be increased from approximately 0.3 to 10 milligrams per liter. In prior art practices; where large volumes of the steam are continuously discharged to the atmosphere it is not practical to add a sufficient quantity of a volatile chemistry such as ammonia to achieve such elevated concentrations. In the preferred embodiment of the present invention, ammonia concentrations well above 20 milligrams per liter in the steam are possible to maintain without the discharge of steam with such elevated ammonia concentrations to the atmosphere.

The preferred embodiment of the present invention also provides for the addition of high concentrations of volatile reducing agents that help promote the passivation of the metal surfaces of the air cooled condenser and other plant systems. Again with the capture of the steam during the procedures described by the present invention, it becomes practical to apply higher concentrations of such passivation enhancing chemistries during process of removing both particulate and non-particulate contamination.

The temporary piping in this embodiment of the present invention also provides for the installation of a temporary connection from the steam piping immediately prior to the steam turbine inlet valve. This embodiment of the present invention also provides for the installation of temporary diffuser(s) into the exhaust duct of the air cooled condenser. The temporary piping and equipment installed for this embodiment of the present invention also provides for the injection of sufficient volumes of clean condensate into the exhaust steam to generate an excess of water droplets that by contact with the exhaust steam will wash the steam of both particulate and non-particulate contamination.

In this embodiment of the present invention, the separation of the particulate and non-particulate contamination is accomplished by the discharge of the steam through the temporary diffuser(s) into the exhaust duct of the air cooled condenser. This duct has a large diameter and sufficiently reduces the velocity of the exhaust steam to allow for the separation of the excess wash condensate from the exhaust steam that is conveyed by the duct to the condenser tube sections some distance from the steam introduction point.

In this embodiment of the present invention, the contaminated condensate separated from the exhaust steam is collected in the drain pot on the exhaust duct. Temporary pumps with suction strainers connected to this drain pot are used to initially remove the highly contaminated condensate from the exhaust duct and discharge it to waste.

In this embodiment of the present invention, temporary condensate storage and temporary condensate pumps and piping are also provided to provide sufficient make-up condensate to the steam generator while the initial highly contaminated steam is being exhausted to the atmosphere. This embodiment of the present invention also provides for the a means to discharge to waste the initial highly contaminated condensate that is returned from the air cooled condenser exhaust duct drain pot as well as the initial condensate returned from the condenser sections. Once the excess wash condensate from the exhaust duct has become clean enough to economically treat, this condensate is then diverted from waste to the a temporary condensate treatment system.

In this embodiment of the present invention, sufficient pump capacity and temporary condensate treatment equipment is provided with the capacity to treat the volume of condensate generated by the condenser at the base load operation of the steam generator combustion system.

This embodiment of the present invention also provides for the installation of rapid closing and rapid opening valves to allow steam discharge to the air cooled condenser to be terminated should conditions warrant such termination to protect the air cooled condenser from damage. The operation of these valves and the overpressure protection equipment is the same as that described above.

The present embodiment of this invention allows for the commissioning of the solid fuel systems and flue gas treatment systems of this type of steam generator as well as the commissioning and steam flushing of the air cooled condenser system simultaneously with the cleaning of the steam path through the steam generator and steam piping to the steam turbine.

In yet another embodiment of the present invention, a pulverized coal fired steam generator with water cooled condenser is commissioned in a similar manner as described above. As applied to a pulverized coal fire steam generator, the present invention allows the use of much less expensive solid fuel to be used to fire the steam generator during the steam cleaning program. As described above the temporary systems are provided to allow at least one coal mill at a time to be operated at base load condition. As with the previous embodiments of the present invention, this allows the removal from the steam path of both particulate and non-particulate contamination simultaneous to the commissioning of the steam generator combustion systems and the flue gas treating equipment. The ability to operate the steam generator at sufficient loads as to allow the coal handling systems, the coal pulverizers, the combustion air systems, the flue gas treatment systems and the fuel ash handling systems to be commissioned provides substantial savings in the amount of time, water and fuel used for the commissioning of the plant when such commissioning performs the steam path cleaning function separate from the other commissioning activities.

As with the previous embodiments of the present invention, the embodiment of the present invention to a pulverized coal fire steam generator will also make use of a means to wash contamination from the steam prior to the admission of the steam to the condenser, the use of chemically treated condensate injected into the steam to effect the formation of an annular mist that enhances the cleaning effectiveness of the steam for both solid particle and non-particulate contamination removal and the treatment of the steam condensate used for this multi-purpose cleaning activity collected from the condenser prior to its return to the steam generator at flow rates sufficient to perform the normal commissioning activities of the steam generator combustion systems.

In yet another embodiment of the present invention, exhaust steam from the steam system flush is also routed by means of temporary piping to the steam coil air heaters of a coal fired or other solid fuel fired plant to perform a steam flush of these circuits at the same time the primary steam cycle is being cleaned. In yet another embodiment of this invention, exhaust steam may also be conveyed through temporary piping to the steam supply lines of the feedwater heater exchangers of the solid fuel fired plant. The steam washing of the steam side of the feedwater heaters promotes complete system cleanliness at the same time the main steam circuits are being cleaned. The initial contaminated condensate from both the steam coil air heaters and the feedwater heaters may be collected and initially discharged to waste. After the wash steam condensate to the steam coil air heaters and feedwater heaters is no longer highly contaminated, the condensate from these circuits may be treated by the same temporary condensate treatment equipment disclosed by this invention for treatment of the condensate from the steam turbine condenser. In addition to the benefit of cleaning these additional steam circuits of both particulate and non particulate contamination as part of an integrated cleaning and passivation process, the discharge of steam to the steam coil heaters and the feedwater heaters has the added benefit of increasing the temperature of the exhaust path of the combustion gases from the boiler. Increasing temperatures in the backpass of the boiler will help maintain the exhaust combustion gas above it dew point. Serious corrosion of the metal surfaces of the boiler backpass can occur if the combustion gas is allowed to cool below its dew point. In addition to the effect of maintaining the boiler backpass above the combustion gas dew point, the simultaneous steam washing of the steam coil heaters and the feedwater heaters also promotes higher combustion air temperatures. Higher combustion air temperatures provide for cleaner and more complete combustion of the fuels burned to support the combined steam cleaning and burner tuning effort. More complete combustion of the fuel reduces the potential of contaminating the combustion gas path of the boiler with unburned fuel and an increased rate of emissions to the environment.

Other objects, features and advantages will be apparent from the following detailed description of preferred embodiments taken in conjunction with the accompanying drawings in which:

BRIEF DESCRIPTION OF THE DRAWINGS

FIG. 4 is a cross-section view of the coalescer;

FIGS. 10A, 10B and 10C are one embodiment of a porous metal shield, sparge tube and condenser tubes.

BRIEF DESCRIPTION OF PREFERRED EMBODIMENTS

Figure 1:
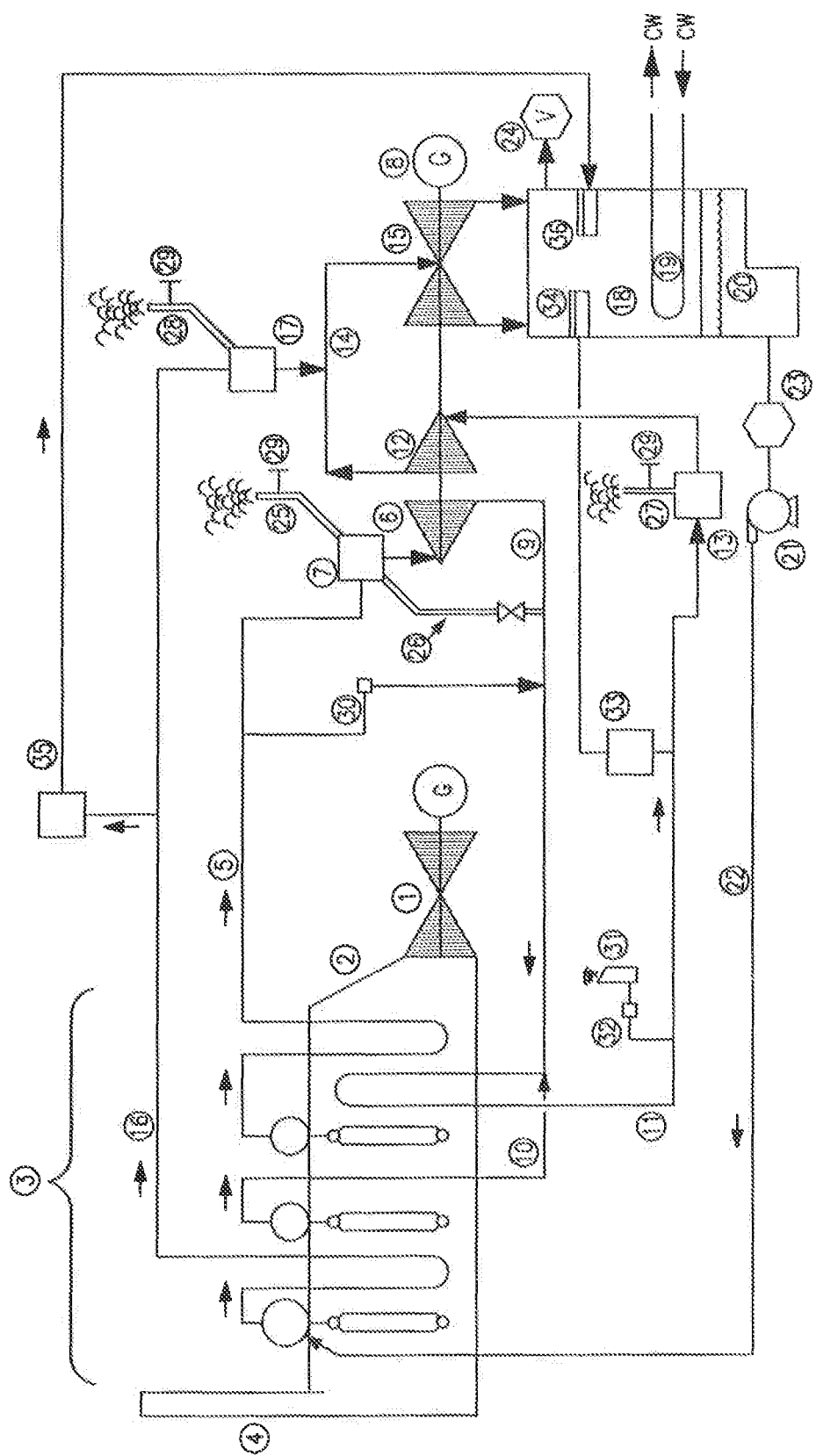
FIG. 1 is a process flow schematic of typical prior art practice for steamblow of piping in a power plant to remove particulate contamination from the steam piping.

The benefits of the present invention are based on the findings that considerable savings of time, fuel and water are realized by application of the enhanced method described by this current invention. In the preferred embodiment of the present invention both particulate and non-particulate contaminations are simultaneously removed from the steam cycle of a steam turbine plant at steam flow and temperature conditions significantly greater than the operational conditions used to complete removal of such contaminations from the steam cycle by means of the prior known art. In the prior art, the steamblow methods have been solely focused on the removal of only the particulate contamination. Unlike the present invention, the operational conditions during the steamblow were not manipulated to provide for the enhance removal of non-particulate contamination simultaneous to the operation of the unit to solely address removal of particulate contamination.

The present invention provides for the removal of such contaminations to a higher standard of cleanliness for both particulate and non-particulate contamination under operational conditions that allow for the concurrent performance of plant operational tuning requirements that must be completed prior to the commercial operation of the steam plant. The ability to perform significant plant combustion tuning simultaneous to the decontamination of the steam cycle is previously unknown to the prior art. This feature of the present invention provides for considerable savings of both time and fuel as the required removal of particulate and non particulate contamination and the tuning activities of the plant combustion systems are completed simultaneously instead of sequentially. With the higher operational firing rates the cleanliness of the steam cycle is achieved in fewer fired hours. The ability of completing particulate, non-particulate and tuning activities simultaneously reduces the amounts of fuel consumed as well as reducing the duration of the commissioning activities.

In addition, the present invention facilitates the higher operational firing rates during the simultaneous removal of both particulate and non-particulate contamination; and the required combustion tuning activity by the recovery of the vast majority of the steam used to perform the decontamination. The present invention describes unique equipment and methods unknown in the prior art that provide for the removal of harmful contamination from the exhaust steam prior to the discharge of the exhaust steam to the plant condenser. In the present invention a means of washing the steam to separate both particulate and non-particulate contamination from the steam prior to the condensation of the steam in the plant condenser is described. In addition the present invention also provides for redundant safety measures that insure the cleanliness of the steam discharged to the plant condenser as well as providing means to protect the plant condenser from temperatures, pressures and flow conditions that may otherwise compromise the condenser integrity. The methods and equipments described by the present invention significantly reduce the amount of high quality water required to complete the decontamination of the steam cycle compared to those practices known to the prior art. The recovery of the vast majority of the steam condensate provided for by the present invention significantly reduces the quantities of high quality water required for the completion of the steam cycle decontamination as well as the combustion process tuning. Under prior art methods, the inability of the new plant to generate a sufficient supply of high quality water has often extended the time required to complete both the decontamination of the steam cycle as well as the initial tuning of the combustion systems. The significantly reduced amounts of high quality water required by the present invention also provide the benefit of reducing the cost of high quality water production.

The present invention also provides for the means to significantly enhance the removal of non-particulate steam contamination by the introduction of significant concentrations of volatile chemical agents into the steam. As provided for in the present invention, chemical agents are added to the steam to accelerate removal of harmful non-particulate contamination from the steam cycle. The application of significant concentrations of chemical agents to enhance removal of non-particulate contaminations from the steam cycle is unknown in the prior art. The removal of non-particulate contamination from the steam cycle is not addressed in the prior art. In the prior art methods, steam or compressed air used for the removal of particulate debris from the steam cycle is vented to the atmosphere. The environmental impact and cost of the atmospheric discharge of chemically treated steam or air precludes such practice from the prior art methods. It is a unique feature of the present invention that the removal of non-particulate contamination is not only addressed by chemically enhanced. The present invention makes this possible by the recovery of both the steam and volatile chemicals used to enhance non-particulate decontamination by discharge of the chemically treated steam to the plant condenser in which both the steam and volatile chemicals are then condensed and eventually returned to the steam cycle.

While the present invention will be described with reference to a combined cycle power plant configuration, it is to be understood that this invention is applicable to other power plant configurations including but not limited to pulverized coal type boilers, fluidized bed type boilers, grate type boilers and other types of power plants equipped with condensing steam turbines.

Referring now to FIG. 1, 1 is a combustion gas turbine generator (CTG) that when operated generates a flow of exhaust combustion gas that is discharged through a duct 2 to pass across a series of tubular coil sections 3 typically described as a Heat Recovery Steam Generator (HRSG). In the HRSG, heat from the combustion gas preheats water, generates steam and superheats the steam in the various coil sections. Once depleted of waste heat, the exhaust combustion gas is discharge to the atmosphere through a stack 4. In a typical installation, high-pressure steam from the HRSG is conveyed by piping 5 to a high-pressure steam turbine 6. Admission of steam to the steam turbine is regulated by stop and control valves 7. The mechanical energy generated by the high-pressure steam as it expands through the steam turbine is used to power a generator 8 connected to the steam turbine shaft.

In a typical combined cycle installation, the steam exhausted from the high-pressure steam turbine is conveyed by piping 9 back to the HRSG to be reheated. Piping 10 from the intermediate-pressure section of the HRSG may add additional steam to the flow of exhaust steam from the high-pressure turbine prior to the reheat section of the HRSG. Upon leaving the HRSG reheat section the reheated steam is conveyed by piping 11 to the intermediate-pressure section 12 of the steam turbine. Admission of the reheated steam to the intermediate stage of the steam turbine is regulated by stop and control valves 13.

Steam that exhausts from the intermediate-pressure section of the steam turbine is conveyed by piping 14 to the low-pressure section 15 of the steam turbine. Low-pressure steam piping 16 is used to convey low-pressure steam produced by the HRSG to the low-pressure turbine. Admission of low-pressure steam to the low-pressure steam turbine is regulated by stop and control valves 17.

In normal operation, steam exhausting from the low-pressure turbine enters a large heat exchanger (condenser) 18 where it is condensed to water. Although there are several types of condensers, a common design contains a large number of small diameter tubes 19 through which cooling water is passed. The steam condensate from the condenser falls into the hotwell 20 situated below the condenser. Condensate pumps 21 return condensate from the condenser to the HRSG 3 by means of condensate system 22. Suction strainers 23 at the suction of the condensate pumps 21 remove particulate contamination from the condensate fed to the pumps from the condenser hotwell 20. Removal of this particulate contamination is required to prevent damage to the condensate pumps 21 and other components of the condensate system 22.

In normal operation, additional mechanical energy is extracted from the steam by the steam turbine by maintaining a vacuum on the condenser. The vacuum on the condenser is maintained either by mechanical vacuum pumps or by steam jet ejectors 24. To prevent damage due to excessive pressures and temperatures, condensers are normally designed to allow steam admission only after a sufficient vacuum is created in the condenser.

To prevent damage and contamination of the steam turbine components, the stop and control valves 7, 12 and 17 are kept closed until it is assured that the steam is free of harmful particulate and non-particulate contamination. In the example prior art steamblow practice shown; the coiled sections of the HRSG 3 that superheat the steam and the piping 5, 9, 10, 11 and 16 used to transport the steam between the HRSG and the steam turbine sections 6, 12 and 15 are flushed with high velocity flows of steam through temporary fixtures and piping 25, 26, 27 and 28 to the atmosphere. To flush particulate debris from the high-pressure piping, steam is typically diverted from the high-pressure stop valve 7 through temporary fixtures and piping 25 to the atmosphere. To flush particulate debris from the intermediate-pressure steam system, temporary piping 26 is installed to divert high-pressure steam to the steam piping 9 used to convey exhaust steam from the high-pressure steam turbine back to the HRSG 3 steam reheat section. The steam that passes through the reheat section of the HRSG 3 and on to the intermediate stop and control valve 13 through the hot intermediate steam piping 11 is also diverted to the atmosphere through temporary fixtures and piping 27 to the atmosphere. Temporary fixtures and piping 28 are also used to divert steam contaminated with particulate material from the low-pressure stop valve 17. Where convenient, the steam exhaust piping 25, 27 and 28 may be combined into a single exhaust system.

This temporary diversion of the particulate contaminated steam is typically continued until highly polished metal targets 29 inserted into the steamblow exhaust indicate that the exhausting steam is free of significant particulate contamination. Particulate contamination entrained in the high velocity steam that is discharged from the temporary steam exhaust piping 25, 27 and 28 will impact the surface of the highly polished metal target leaving an impression on the polished surface. Periodically the highly polished targets will be removed and examined to determine the continued presence of particulate contamination in the exhausting steam. The prior art does not provide for a means of measuring the concentration of non-particulate contamination in the exhausting steam at the same time that particulate contamination is being removed.

Prior art practices often include the addition of low quality service water to the exhausting steam after the target insertion point to cool and decelerate the steam that is exhausted to the atmosphere. This steamblow activity will frequently require several days to more than a week to complete.

The discharge of large volumes of steam required to perform such a high velocity steam flush requires the supply of substantial volumes of high purity water for the duration of the steamblow. Typically the combustion gas turbine 1 is operated only at a rate sufficient to generate the steam flow conditions that satisfy the steam turbine manufacturers steam flushing requirements. These rates are normally 20-30% of the maximum firing rate of the combustion gas turbine. It is common for the steamblow process to consume over one million gallons of high purity water.

Once the steam is free of particulate contamination, the steamblow is terminated and the plant piping is reconfigured to the normal operating arrangement. Once the plant is restored to its normal configuration, the combustion gas turbine generator 1 will again be operated. In a typical installation, valves 7, 12 and 17 will remain closed to prevent admission of steam to the steam turbine sections until testing of the steam for non-particulate contamination shows that the steam quality is of acceptable purity to be safely admitted to the steam turbine. During this period, steam generated by the high-pressure section of the HRSG into the outlet piping 5 is diverted through conditioning valve 30 to the high-pressure steam turbine exhaust piping 9 that returns steam to the HRSG 3 to be reheated. To regulate the temperature of the high-pressure steam passing through valve 30, high purity water is added to the steam. This is necessary to lower the temperature (condition) the steam to prevent overheating of the high-pressure steam turbine exhaust piping 9 and the reheater section of the HRSG 3.

The reheated steam from the HRSG 3 that cannot be safely admitted to the steam turbine intermediate-pressure section due to the presence of non-particulate contamination is typically vented to an atmospheric silencer 31 through a vent valve 32. If the steam vented through the reheater vent valve 32 is not free on particulate contamination, the steam passages through this valve may be fouled or damaged. Once it is deemed safe to discharge steam to the plant condenser 18, and the condenser is under a sufficient vacuum, a reheat steam conditioning valve 33 is opened to bypass steam to the condenser 18. To protect the condenser from the high temperatures of the reheated steam, the conditioning valve 32 is designed to add sufficient condensate into the bypassed steam to lower the temperature of the steam entering the condenser to a level consistent with the condenser's design limits. The reheat steam that is bypassed to the condenser is distributed above the large number of condenser tubes by a perforated sparge tube 34.

Steam containing non-particulate contamination not suitable for admission to the steam turbine is often bypassed to the condenser for an extended period of time until the levels of non-particulate contamination are reduced to levels that meet the steam turbine manufactures requirements. If the steam bypassed to the condenser through the conditioning valve 33 is not completely free of particulate contamination, the bypass conditioning valve 33 and the distributor sparge tube 34 may be damaged or fouled. The condenser tubes 19 may also suffer erosion damage due to the impingement of high velocity particulate contamination onto the condenser tube surfaces.

Low-pressure steam generated by the HRSG 3 and conveyed to the low-pressure section of the steam turbine 15 by piping 16 may also be diverted directly to the condenser until the levels of non-particulate contamination in the steam meet the cleanliness requirements of the steam turbine manufacturer. This diversion is made through yet another bypass conditioning valve 35. The low-pressure steam that is bypassed to the condenser is distributed above the large number of condenser tubes by a second perforated sparge tube 36. Condensate is added to the low-pressure steam that is diverted through the bypass valve 35 to reduce the temperature of the low-pressure steam bypassed to the condenser. If the steam bypassed to the condenser through the conditioning valve 35 is not completely free of particulate contamination, the bypass conditioning valve 35 and the distributor sparge tube 36 may be damaged or fouled. The condenser tubes 19 may also suffer erosion damage due to the impingement of high velocity particulate contamination onto the condenser tube surfaces.

The exterior surfaces of the large number of condenser tubes 19 in the condenser are not flushed during the steamblow used to remove particulate contamination from the steam sections of the HRSG 3 and the steam piping 5, 9, 10, 11, and 16. Due to the large metal surface area of the condenser tubes 19 a significant amount of particulate and non-particulate contamination may be entrained in the condensate supplied to the condensate pumps 21 from the condenser hotwell 20. The suction strainers 23 of the condensate pumps are designed to remove particulate contamination that may damage the condensate pumps and sensitive components of the condensate system 22. Depending on the care taken to manually flush the condenser 18, condenser tubes 19 and the condenser hotwell 20, the suction strainers 23 of the condensate pumps 21 may have to be clean numerous times. The combustion gas turbine generator 1 consumes significant quantities of fuel gas during the extended period of time required to purge non-particulate contamination remaining in the steam cycle following the completion of prior art types of steamblows.

The method of the present invention provides for an improved means for simultaneously removing both particulate and non-particulate contamination from the plant steam cycle as the combustion gas turbine generator 1 is operated at a firing rate that also allows simultaneous tuning of the combustion gas turbine burners. The method by which this is accomplished is illustrated by reference to FIG. 2 that represents the same general arrangement of a combined cycle power plant as illustrated in FIG. 1.

Figure 2:
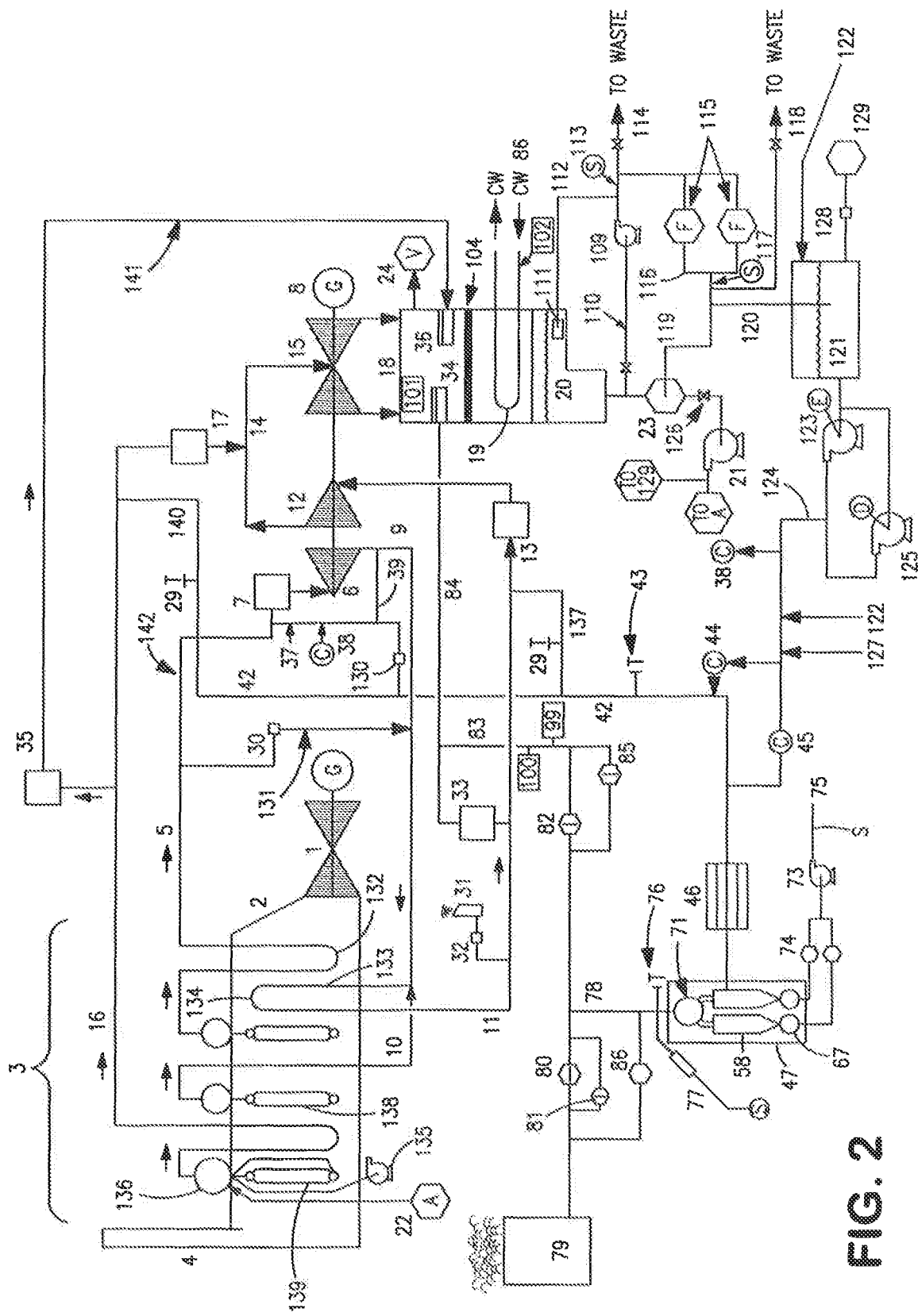
FIG. 2 is a process flow schematic of one embodiment of the present invention to provide for the simultaneous removal of particulate and non-particulate contamination from the complete steam cycle.

Referring to FIG. 2, in the preferred embodiment of the present invention, temporary piping 37 is installed at the end on the high-pressure steam piping 5 to divert steam from the high-pressure steam turbine 6. As in prior the prior art, this diversion may be accomplished by means of a special fixture installed at the high-pressure steam stop valve 7. Although such fixtures may be used with the present invention, these fixtures typically represent a significant restriction to the flow of steam. Due to the greater quantities of steam generated during the operation of the combustion gas turbine generator 1 during the application of the present invention, the preferred embodiment of the present invention is to connect the temporary piping directly to the high-pressure steam piping a short distance prior to the stop valve 7. This can be accomplished by connection of the temporary piping to a drain pot on the high-pressure steam piping 5 used to remove condensate from the piping. In most modern power plant designs, the maximum design temperature of the high-pressure steam will exceed 1,000° F. In prior art steamblow methods shown in FIG. 1, due to the lower rates of operation of the combustion gas turbine generator during the steamblow, the temporary piping 26 is often constructed of carbon steel material.

In the preferred embodiment of the current invention, the combustion burners of the combustion gas turbine generator will be tuned simultaneously with the performance of the steamblow. During such tuning, the temperature of the steam during the steamblow will typically reach the maximum design temperature of the high-pressure steam piping. As a result it is necessary for the first section of the temporary piping 37 used with the present invention to be constructed of high temperature alloy piping capable of safely operating at the elevated steam temperatures and flows generated as a result of the full load operation of the combustion gas turbine generator 1. Under the present invention, in situations where the HRSG 3 has been added to an existing combustion gas turbine generator 1, the present invention also allows for the base load operation of the combustion gas turbine generator 1 while the steamblow is being completed. The combustion gas turbines generally operate much more efficiently at base load than at the lower operating rates commonly used by prior art steamblow practices. n a preferred embodiment of this invention, the use of allow steel for the temporary piping 37 may be avoided by installation of a temporary condensate injection point 142 on the high pressure steam piping 5 prior to the high pressure stop valve 7. Injection of sufficient condensate at this point will cool the exhaust steam sufficiently to allow the safe use of carbon steel pipe for the temporary piping 37.

Once the steam enters the high temperature temporary piping 37 from the high-pressure steam header, a temporary attemperator 38 is used to inject condensate or boiler feedwater into the exhausting high-pressure steam to further cool the steam to a temperature within the design limits of the high-pressure steam turbine exhaust piping 9. When it is not possible to install a condensate injection point 142 in the high pressure steam piping, it will be necessary for the first section of the temporary piping 37 to be constructed of alloy steel. A short distance of approximately 20 to 30 pipe diameters after the location of this temporary attemperator 38, the material of the temporary piping 37 may be changed from high temperature alloy piping to carbon steel piping.

Under the preferred embodiment of the present invention, the temporary piping 37 will discharge the cooled steam exhausted from the high-pressure steam piping 5 into the high-pressure steam turbine exhaust piping 9. Under the preferred embodiment of the present invention, the temporary exhaust piping 37 will also have a tee equipped with a valve 39 that can be used to discharge steam from this point directly to the steam exhaust header 42. The arrangement of the tee is such that solid particle contamination that is entrained in the steam that exhausts from the high-pressure steam piping 5 will preferentially be discharged directly to the steam exhaust header 42.

In the preferred embodiment of the present invention, the valve on the tee 39 will be opened during the initial firing of the combustion gas turbine generator to insure that debris from the high-pressure steam section of the HRSG 3 and the high-pressure steam piping 5 are preferentially discharged into the steam exhaust header 42 rather than the high-pressure steam turbine exhaust piping 9.

The initial steam that exhausts from the high-pressure steam piping 5 into the steam exhaust header 42 will be contaminated with high concentrations of both solid particle and non-solid particle contamination. In the preferred embodiment of the present invention, a high temperature target insertion device 43 will be positioned on the steam exhaust header to allow the cleanliness of the steam exhaust to be determined. This device is similar in design to the target devices 29 described in the earlier prior art. However due to the higher temperatures and higher steam flow rates generated by the preferred embodiment of the current invention, the target insertion device 43 must be constructed of high temperature alloy metallurgy to withstand the forces of the exhaust steam. The high temperature target insertion device 43 is used to determine the presence of particulate contamination of the exhaust steam prior to the steam conditioning equipment 44, 45, 46 and 58.

One of the primary objectives of the present invention is to wash the exhaust steam and sufficiently remove both entrained solid particle and non-solid particle contamination from the steam to allow the safe discharge of the exhaust steam to the plant condenser 18. To do this a large volume of high purity condensate is sprayed into the exhaust steam by one or more injection nozzles 44. Sufficient condensate is injected into the steam to lower the steam to the steam saturation temperature. In the preferred embodiment of the present invention, sufficient condensate is injected by the spray nozzles 44 to cause the steam to become laden with fine droplets of condensate. In prior art steamblow technology; low quality service water is injected into the exhaust steam to decelerate the steam sufficiently to avoid a sonic discharge and excessive noise at the exhaust point of the steam to the atmosphere. In the preferred embodiment of the present invention the steam flow conditions in the steam exhaust header are at a high velocity sufficient to promote turbulent mixing of the entrained condensate droplets with the contaminated steam. The smaller particulate contamination and the salts that comprise the non-particulate contamination entrained in the exhaust steam will become entrained in the liquid condensate droplets as the liquid condensate droplets are vigorously mixed by the turbulence of the exhausting steam.

Figure 3B:
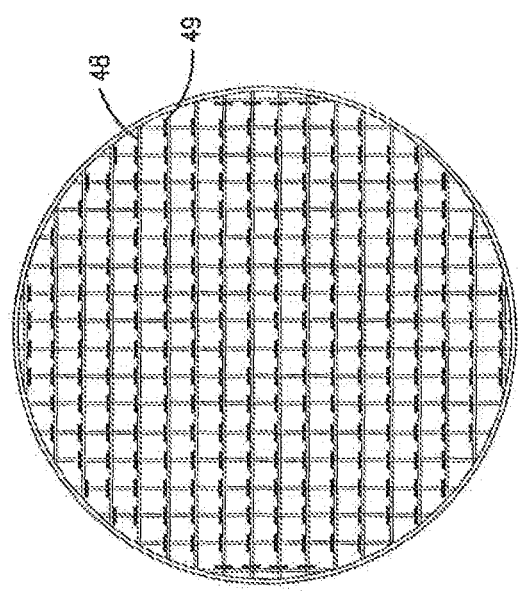
FIGS. 3A and 3B are perspective views of the condensate wash and coalescer apparatus used to remove particulate and non-particulate contamination from contaminated steam prior to its discharge into the condenser.
Figure 3A:
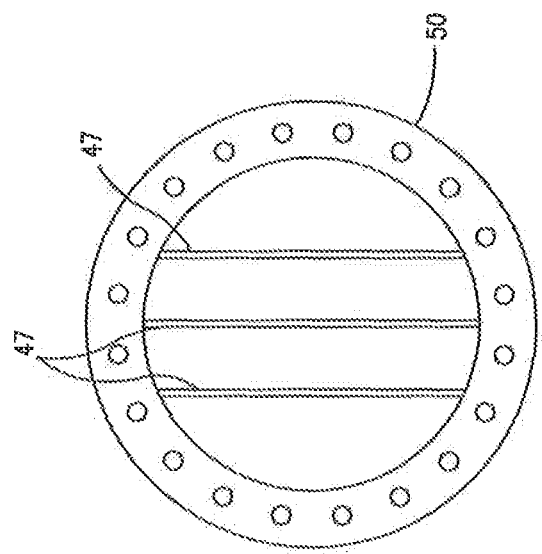

In the preferred embodiment of the present invention, a second condensate injection spray 45 may be positioned on the exhaust steam piping to insure that the exhaust steam contains a sufficient amount of entrained water droplets to affect a thorough washing of the exhaust steam. Following the condensate injection sprays, the mixture of steam entrained water droplets and entrained solid particle contamination are discharged into a coalescing section of the exhaust header 46. A cross-sectional view of a preferred embodiment of the inlet of coalesce section in shown in FIGS. 3A and 3B.

In the preferred embodiment of the present invention, the inlet of the coalescing section is divided into four flow channels of equal cross sectional area by metal plates 47. Situated behind these dividing plates 47 is a piece of square grating 48 to which are attached a large number of metal rods 49 of unequal length. The metal rods 49 are arranged such that the long axis of the rod is parallel to the flow direction of the mixture of steam and the entrained condensate droplets. The coalescing section of the steam exhaust header is connected to the exhaust header piping by means of a standard flanged joint connection 50.

Figure 5:
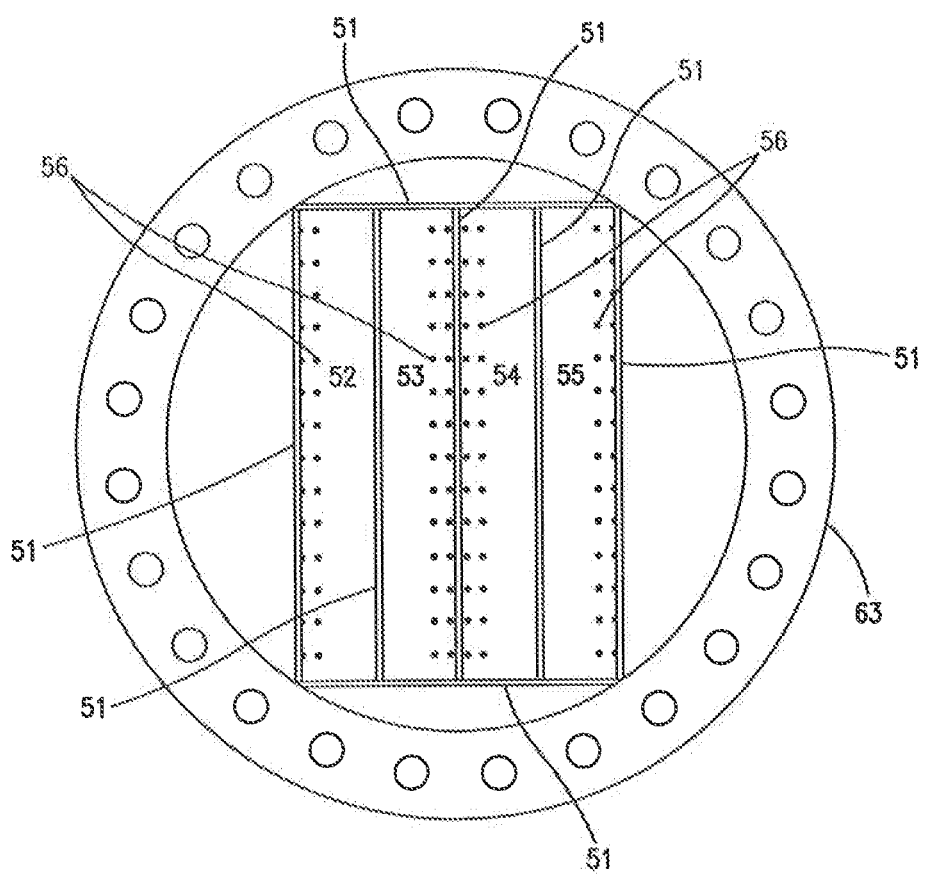
FIG. 5 is a perspective view of one embodiment of the steam/wash condensate cyclonic separator apparatus.

A top view of the coalescing section of the steam exhaust header is shown in FIG. 4. The four channels defined by the dividing plates are also constricted by additional metal plates 51 fixed to the inside walls of the coalescer section to form four rectangular channels 52, 53, 54 and 55 at the outlet of the coalescer section as shown in FIG. 5. The ends of the side plates are also shown in the outlet cross-section view of the coalescer section of the steam exhaust header in FIG. 5. The outlet end of the coalescing section of the steam exhaust header is provided with a standard pipe flange connection 63 with which it may be joined to the inlet of the cyclonic separator section 58. The cross-sectional area of the coalescer section is sufficient to maintain or even reduce steam velocities in spite of the flow area occupied by the divider plates and the included metal rods.

In the preferred embodiment of the present invention, the surfaces of the metal rods 49 are rough so as to provide a large amount of surface upon which the condensate droplets and solid particle contamination entrained in the exhaust steam will impinge and be held up. The large surface area represented by the large number of rough rods included in the coalescing section of the steam exhaust header has the effect of significantly reducing the wetted diameter of the coalescing section. As a result, the turbulence of the steam through this section of the steam exhaust header is significantly reduced. As a result of the impact between the entrained condensate droplets and the entrained solid particle contamination on the rough rod surfaces and the reduction of the turbulence of the steam through the coalescing section of the exhaust steam header, the velocity of the entrained condensate droplets and solid particles are reduced relative to the velocity of the steam passing through this section.

The length of the rods in each flow channel of the coalescing section is not equal. Referring to FIG. 4, the rods with the longest length 56 are positioned on the side of each flow channel that will be aligned with the outer radius of each of the four inlet channels 59, 60, 61 and 62 of the cyclonic separator 58 into which the mixture of steam and entrained condensate droplets are discharged. Each succeeding row of rods is shorter with the shortest rods 57 in the flow channel positioned closest to the center of the cyclonic separator. This variation in the length of the rough rods provides a means of increasing the frictional resistance that the surface of the rough rods imparts to the steam flowing through the coalescing section of the steam exhaust header with the effect that the velocity of the steam closest to the outer wall of the cyclonic separator is reduced relative to the velocity of the steam closer to the center of the cyclonic separator. The lower steam velocity near the outer wall of the cyclonic separator provides for an improved performance of the cyclonic separator.

The impingement of the entrained condensate droplets and any solid contamination entrained in the steam on the rough surfaces of the rods reduces the velocity of the condensate droplets and the solid contamination particles relative to the velocity of the steam passing through the coalescing section of the steam exhaust header. The rough surface of the rods will further retard the velocity of the condensate droplets with the result that the size of the droplets is increased. The reduction of condensate droplet velocity and the particulate contamination particles relative to the steam velocity and the increase size of the condensate droplets improves the function of the cyclonic separator 58 into which the steam, droplets and solid particle contamination are discharged from the coalescing section.

Figure 6:
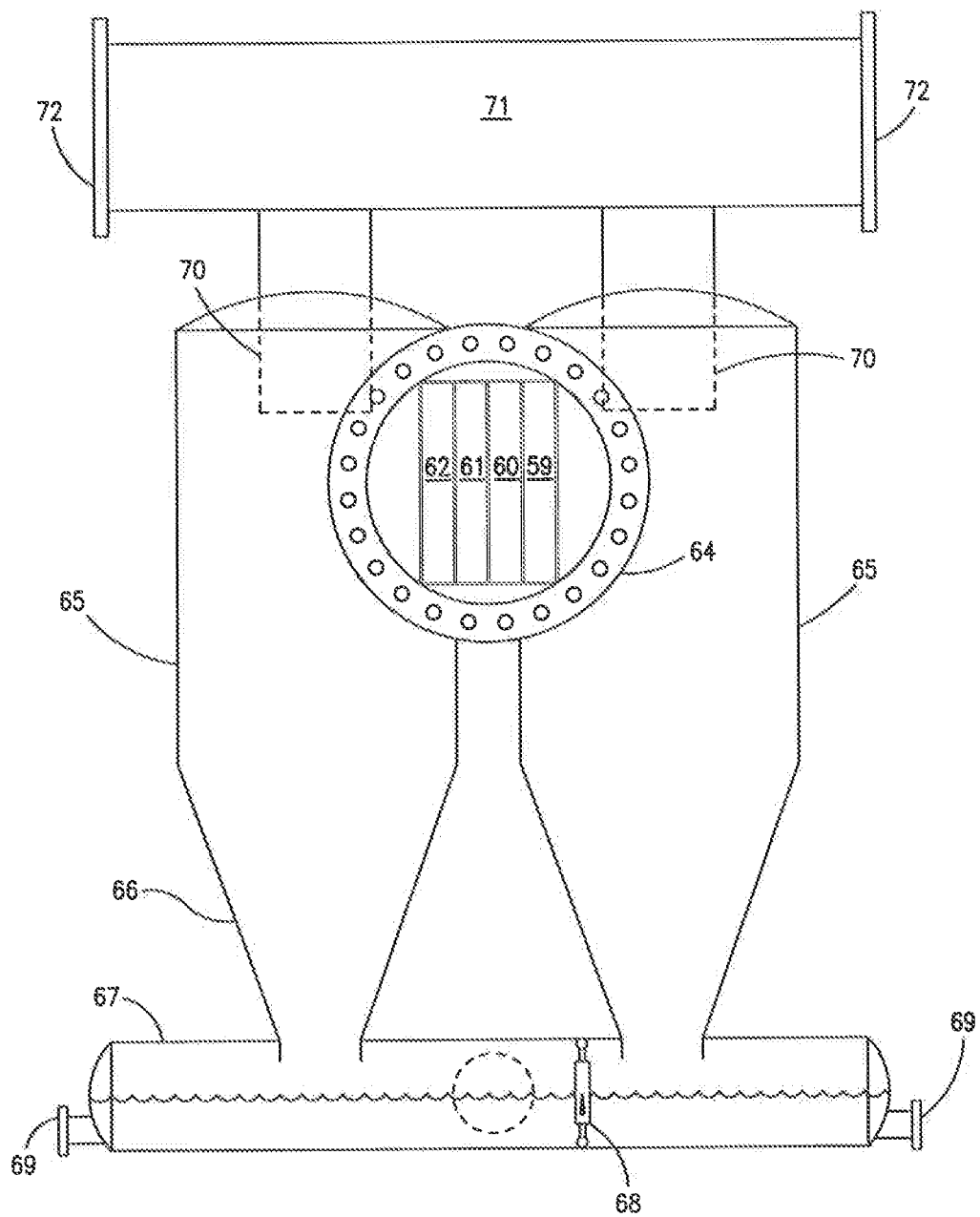
FIG. 6 is a process schematic of one embodiment of the rapid acting control system for the diversion of steam from the condenser.

A cross-sectional view of the inlet of the cyclonic separator section of the steam exhaust header is shown in FIG. 6. The four steam flow inlet channels 59, 60, 61 and 62 align with the four channels 52, 53, 54 and 55 of the coalescing section of the steam exhaust header. The cyclonic separator section 58 of the steam exhaust header is joined to the coalescing section 46 of the steam exhaust header by means of a standard pipe flange connection 64.

In the preferred embodiment of the present invention, the cyclonic separator section 58 of the steam exhaust header will consist of four cylindrical barrel sections 65. The mixture of the steam, solid particle contamination and the condensate droplets containing small particulate contamination and salts that comprise the non-particulate contamination enter each barrel section 65 tangentially at a high velocity. Centrifugal forces cause the solid particle contamination and condensate droplets that contain both small solid particle contamination as well as non-particulate contamination to collect on the outer wall of each barrel.

The contaminated condensate droplets and solid particulate contamination entrained in the exhaust steam will drop to the bottom coned section 66 of the cyclonic separator barrel 65. In turn the contamination will then drop into a collection tank 67 positioned below the cyclonic separator barrels. In the preferred embodiment of the present invention, the collection tank is equipped with a level indication device to show the level of contaminated water in the collection tank. The collection tank is also equipped with several flanged connections 69 from which the contaminated condensate and particulate debris may be removed from the collection tank.

The high velocity steam that tangentially enters the barrel section of the cyclonic separator is exhausted from the cyclonic section of the steam exhaust header through a cylindrical exhaust tube 70 that protrudes into the top of each of the cyclonic separator barrels 65. The steam that exits each of the four barrel sections of the cyclonic separator section has been separated from the entrained contamination by means of the centrifugal forces acting on the contaminated particles and contamination containing condensate droplets. The steam that exits the four sections of the cyclonic separator is collected in a common steam outlet header 71. This exhaust header is equipped with a number of standard pipe flange connections 72 that provide a means of connection the steam outlet header to the remainder of the steam exhaust header system.

Figure 7:
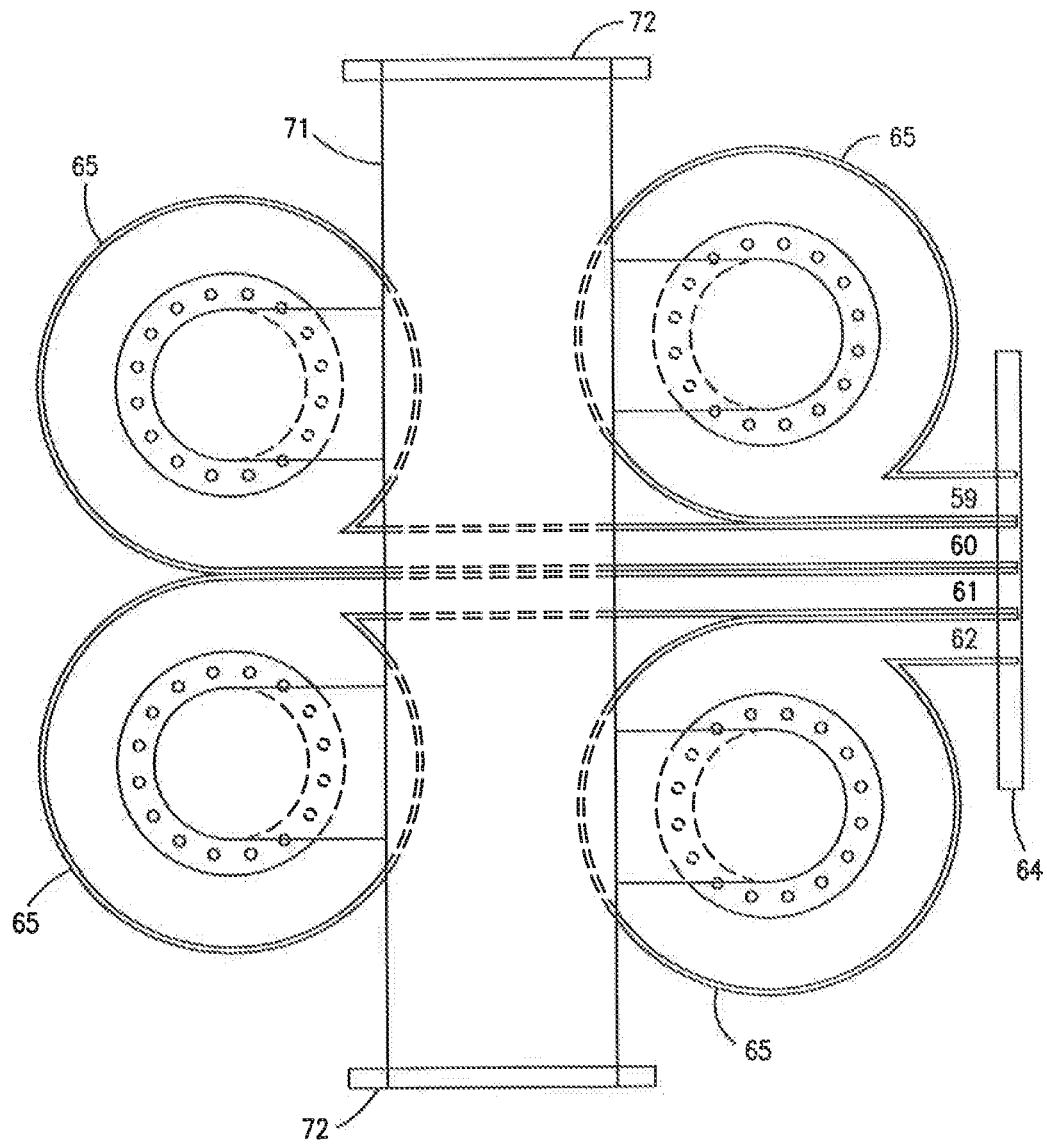
FIG. 7 is one embodiment of the porous shield apparatus used to protect the thin walled condenser tubes.
Figure 8:
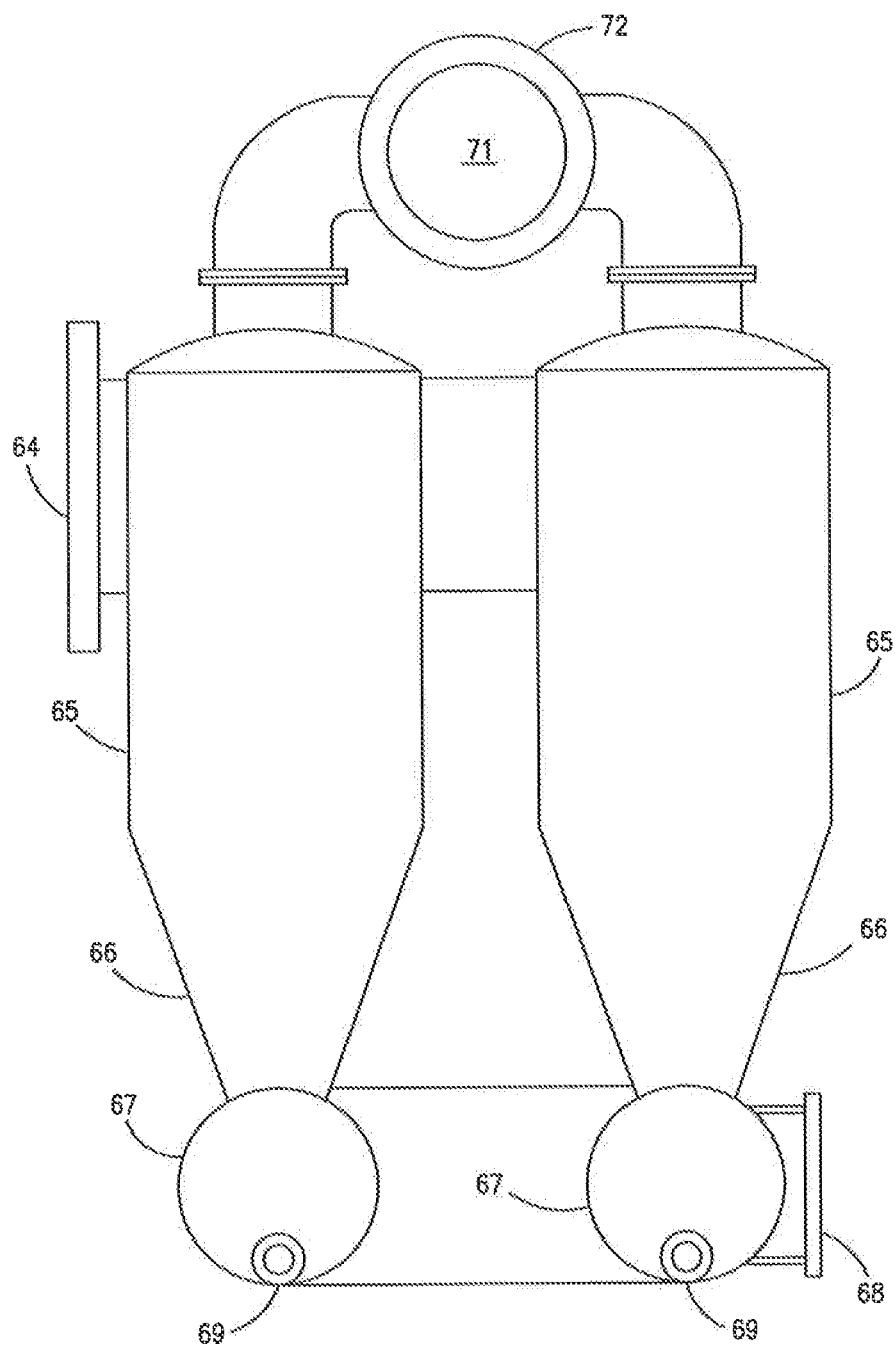
FIG. 8 is side view of the one embodiment of the cyclonic separator.

FIG. 7 is a top view of the cyclonic separator section of the exhaust steam header showing the same components from a different view. FIG. 8 is a side view of the cyclonic separator.

Referring again to FIG. 2, in the preferred embodiment of the present invention, the condensate used to wash the exhaust steam that is separated by the combined action of the coalescing section and the cyclonic separator section of the exhaust steam header system is removed from the cyclonic separator collection tank by means of a condensate removal pump 73. The multiple drain connections 69 on the collection tank 67 are used to supply the contaminated condensate through multiple strainers 74 to the suction of the condensate removal pump. The contaminated condensate removed from the collection tank 67 of the cyclonic separator 58 is discharged to waste or recycled to a condensate polishing system to be described latter. The level of non-particulate contamination in the contaminated steam that exhausts from the plant piping system is monitored by means of a sample point 75 on the condensate removal system from the collection tank 67 of the cyclonic separator. The samples taken from this sample point are monitored for the presence of solids as well as cation conductivity, silica, sodium and other contaminants that are detrimental to the proper operation and maintenance of the steam turbine.

The cleansed steam that exhausts from the cyclonic separator common steam outlet header 71 will not contain solid particulate and non-particulate contamination at levels harmful to the operation of the plant condenser 18 or other plant equipment. To confirm exhaust steam cleanliness is suitable for discharge to the plant condenser 18, a target insertion device 76 is positioned at the outlet of the coalescing section. Whereas the polished metal targets used to measure the steam cleanliness contaminated steam exhausted from the plant steam circuits will be made of brass or steel, the target material inserted into the washed exhaust steam is made from highly polished aluminum. The soft surface of the highly polished aluminum will show the presence of fine solid particle contamination entrained in the exhaust steam. Periodic inspection of the soft aluminum target confirms that the solid particle contamination indicated by the targets inserted into the contaminated exhaust steam at target injection point 43 positioned prior to the wash condensate injection, coalescer section and cyclonic separator sections has been successfully removed. The presence of non-particulate contamination in the cleansed steam from the common steam outlet header is also tested to determine the concentration for non-particulate contamination by means of a sample point 77 at the outlet header of the cyclonic separator. In the preferred embodiment of the present invention, this sample point is equipped with a small heat exchanger to condense the steam sampled to generate a liquid sample that may be tested for harmful contaminants. The function of the condensate wash, coalescer section and cyclonic separator section in removing both particulate and non-particulate contamination from the exhaust steam is monitored by comparison of the analytical tests performed on the condensate samples taken from sample points 75 on the contaminated condensate removal system and sample point 77 on the cleansed exhaust steam outlet header.

In the preferred embodiment of the present invention, the cleansed exhaust steam that exits the cyclonic separator enters a clean steam exhaust manifold 78 at the outlet header of the cyclonic separator device. From this manifold the cleansed exhaust steam may be directed to one of several different flow paths. During the initial operation of the exhaust steam header system, the exhaust steam is directed to the atmosphere. In the preferred embodiment of the present invention this steam is discharged through a silencer device 79 to the atmosphere by way of quick operating valve 80. A second flow path for the exhaust steam is provided by a bypass valve 81 that also provides a steam path to the atmosphere. A third flow path for the exhaust steam is provided through quick operating valve 82 into temporary piping 83. In the preferred embodiment of the present invention the temporary piping 83 conveys the clean exhaust steam to the plant reheat bypass piping 84. The steam that enters the plant reheat bypass piping 84 will continue to a diffuser device 34 in the plant condenser 18. In a variation of the present invention, the temporary piping 83 may be connected directly to the condenser 18 and a temporary diffuser installed specifically for the commissioning of the steam system. A fourth flow path for the exhaust steam is provided by a bypass valve 85 that also provides a steam path to the condenser 18. A fifth flow path for the exhaust steam from the outlet of the cyclonic separator is provided by a pressure relief system 86. This pressure relief system may consist of rupture disks, spring loaded safety valves or other similar devices set to automatically open should the pressure of the steam in the cyclonic separator outlet header 78 exceed a preset design limit.

In the preferred embodiment of the present invention, the initial steam flow will discharge through valves 80 and 81 to the atmospheric silencer 79. Steam flow to the condenser 18 will be prohibited by maintaining valves 82 and 85 in the closed position. This flow arrangement will be maintained until the cleanliness of the exhaust steam at the cyclonic separator outlet header 78 can be confirmed by the samples taken from sample point 77 and the target insertion point 76. The discharge of the exhaust steam to the atmosphere will also allow time for a vacuum to be generated on the condenser 18 by the condenser vacuum system 24.

Once it is confirmed that the exhaust steam cleanliness meets criteria for safe discharge to the plant condenser 18, and the condenser vacuum system 24 has reduced the pressure in the condenser to a level that is within the design limits of the condenser, the bypass valve 85 on the steam flow path to the condenser is slowly opened to warm the temporary piping 83 and the plant reheat bypass piping 84. The steam that passes through the bypass valve 85 will enter the condenser 18. The ability of the condenser vacuum system 24 to maintain a vacuum within the design limits of the condenser 18 with the admission of steam to the condenser is also verified with the steam flow through the bypass valve 85.

Once it is confirmed that the exhaust steam cleanliness meets the design limits of the condenser 18 and that the condenser vacuum system 24 is maintaining a vacuum with the design limits of the condenser, the quick operating valve 82 is opened increasing the flow of steam to the condenser. Once full exhaust steam flow to the condenser is established through quick opening valve 82 the quick opening valve 80 to the atmosphere is closed. The bypass valve 85 is also closed. The bypass valve 81 is left partially open to maintain a minimal steam flow to the atmospheric exhaust silencer 79 to keep this piping warm.

The safe operation of the condenser 18 requires that the temperature and pressure of the steam entering the condenser be maintained within the design limits of the condenser. The continued operation of the condenser vacuum system 24 and the condenser coolant system 86 are critical to that safe operation. Loss of the vacuum system or coolant system flow may result in the rapid heating of the metal parts of the condenser with the result that condenser components are damaged. Temperatures and pressures that exceed the design limits of the condenser 18 may also result in thermal expansion of steam turbine components 15 in direct communication with the condenser and result in damage to those components. An over pressure condition in the condenser may also cause the condenser safety relief system to fail.

Figure 9:
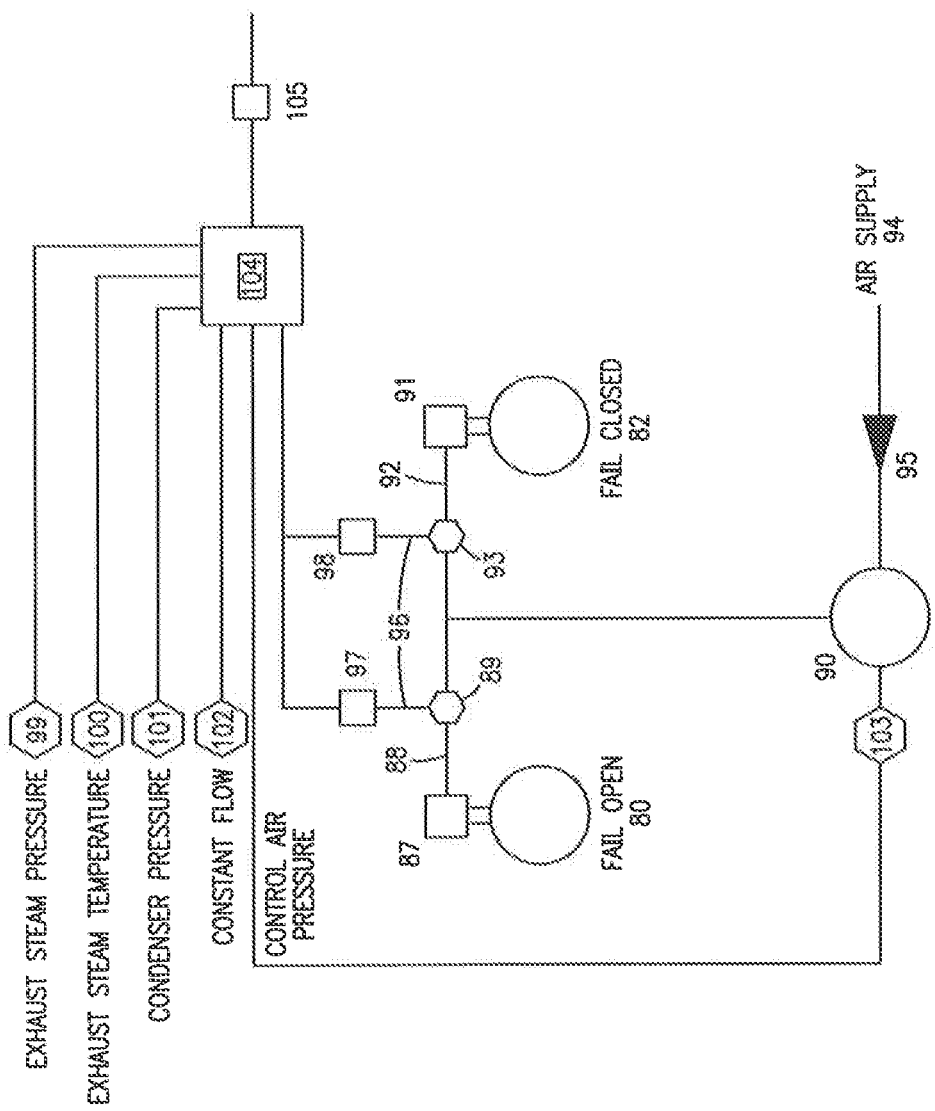
FIG. 9 is one embodiment of a control system for steam admission to the condenser from the exhaust steam system.

To protect the condenser and other plant components from potential damage, the preferred embodiment of the present invention provides for a means for rapid termination of steam admission to the condenser from the exhaust steam system. Referring to FIG. 9, the flow control valve 80 on the flow exhaust steam flow path to the atmosphere is equipped with a valve operator 87 designed to rapidly open the valve 80 should the air supply 88 to the valve pneumatic operator be discontinued. The air supply 88 is provided through solenoid valve 89 from an air reservoir tank 90. The solenoid valve 89 is set to close in the event of an interruption of electrical power to the solenoid valve. This would in turn interrupt the air supply to the rapidly operating valve 80 causing it to open and release the exhaust steam to the atmosphere.

In similar fashion the control valve 82 on the exhaust steam flow path to the condenser 18 is equipped with a valve pneumatic operator 91 designed to rapidly close should the air supply 92 to the pneumatic operator be discontinued. The air supply 91 is provided through solenoid valve 93 from an air reservoir tank 90. The solenoid valve 93 is set to close in the event of an interruption of electrical power to the solenoid valve.

The compressed air is supply 94 to the air reservoir tank 90 may originate from the normal plant compressed air system or from a temporary air compressor supplied for that purpose. The air inlet to the air reservoir tank 90 is equipped with a check valve 95 designed to prevent depressurization of the compressed air reservoir tank should the compressed air source 94 become compromised.

Electrical power is supplied to the solenoid valves 89 and 90 by electrical wiring 96. Electrical switches 97 and 98 located at a position convenient to the steam exhaust system, may be used to manually operate the rapid closing valves 80 and 82 locally. This feature allows for the testing of the system prior to the start of the operation, the local control of the system manually for the initial introduction of exhaust steam to the condenser, and local operation of the valves in the event of a safety or operational problem.

The process of removing both particulate and non-particulate contamination from the steam systems of the plant may take a number of hours to complete. In the preferred embodiment of the present invention, an automated control system is used to monitor the condition of the exhaust steam, the condenser and other systems to assure the safety of the condenser. This control system is designed to automatically interrupt the electrical power supply to the solenoid valves 89 and 93 if certain critical design conditions are not maintained. Sensors that monitor the exhaust steam pressure 99, the exhaust steam temperature 100, the condenser pressure 101, the flow of coolant to the condenser 102 and the pressure of the compressed air reservoir tank 103 are connected to a controller that will interrupt the electrical power supply to the solenoid valves 89 and 90 should the condition of any of these variables deviate from preset design limits. In the preferred embodiment of the present invention, a master power supply switch is also located in the plant control room to allow the power plant operators the ability to stop steam admission to the condenser for any reason.

Again referring to FIG. 2, as previously described, the cleansed exhaust steam that is discharged to the condenser is distributed in the condenser by means of an internal distributor device 34. These steam distributor devices normally used to discharge reheat steam within the condenser frequently consist of a perforated section of pipe. The number and size of the perforations in this distributor pipe are designed to generate a specified backpressure on the reheat bypass valve 33. It is common for the size and number of perforations in the distributor device 34 to be limited to result in a backpressure of 100 psig or more at the outlet of the reheat bypass control valve 33. A higher backpressure on this valve will allow the use of a smaller bypass valve and bypass piping 84. A higher backpressure on the exhaust steam during the operation to clean the steam system of particulate and non-particulate contamination is not beneficial, as higher pressures will reduce steam velocities in the steam paths being cleaned. Higher steam velocities improve the ability of the exhaust steam to entrain contamination into the steam.

In the preferred embodiment of the present invention, the steam distribution device 34 in the condenser is modified to reduce the backpressure on the exhaust steam header system and the plant steam paths to facilitate a more rapid removal of both particulate and non-particulate contamination from the steam path. An increase in the number and size of the perforations in a modified steam distributor device will reduce the pressure drop of the steam as it expands through the perforations and also reduce the potential for the generation of high-energy sonic disturbances that may otherwise induce harmful vibrations in the thin walled condenser tubes 19.

Where it is not practical or desirable to modify the permanent steam distribution device 34 to reduce backpressure, a temporary steam distribution device may be installed.

Although the steam leaving the cyclonic separation section 58 of the exhaust steam system can be sampled by means of the soft aluminum target insertion device 76, additional contamination origination in the temporary exhaust piping 83 and the plant reheat bypass pipe 84 may become entrained in the steam exhausted to the condenser 18 through the distributor 34. In addition, any upset condition in the operation of the exhaust steam condensate wash, coalescer and cyclonic separator sections may result in a short term exposure of the thin walled condenser tubes 19 to the erosive effects of entrained high velocity condensate droplets and/or particulate contamination. Although the temporary piping 83 and the reheat bypass piping 84 may be manually cleaned and inspected to minimize the potential for damage to the thin walled condenser tubes 19 due to such entrain materials, in the preferred embodiment of this invention an impingement shield is installed in the condenser to protect the condenser tubes from damage.

Figure 10C:
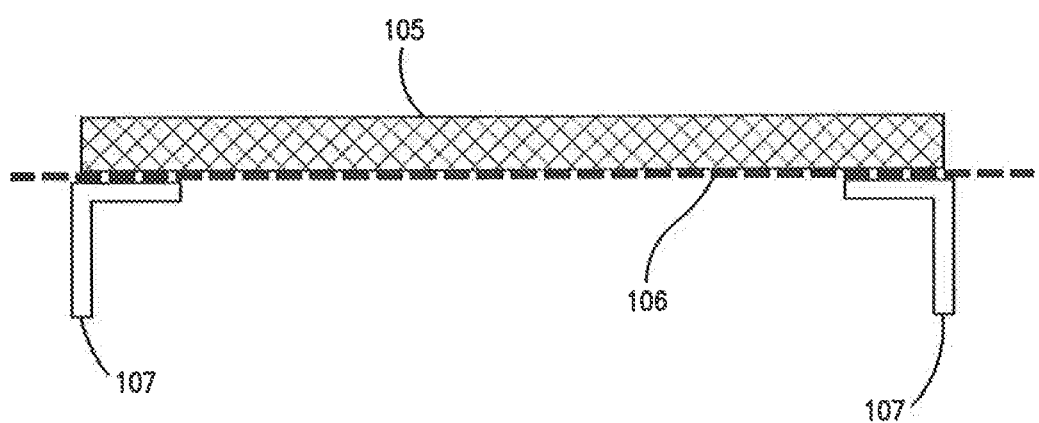

Referring to FIGS. 10A, 10B and 10C, the preferred embodiment of the present invention provides the installation of a porous metal shield 104 between the steam distributor device 34 the top row of the thin walled condenser tubes 19. In one potential variation of the invention, the porous metal shield consists of one or more layers of woven wire cloth 105 fixed to an expanded metal support 106. The frame is in turn fixed to metal brackets 107 that are fixed to the condenser tube support sheets 108. Normally the entry port available to gain access to the interior of the condenser has a limited diameter. As a result it is necessary that the porous shield device be assembled inside the condenser from components that are able small enough to fit through the entry port. The typical assembly of the porous shield device is shown in the detail of FIG. 10A.

In addition to providing a surface upon which entrain particulate contamination and water droplets may impinge, the porous metal shield also generates a small amount of pressure drop as the steam passes through the shield. As an added benefit, the shield therefore helps distribute the exhaust steam more uniformly across the top surface area of the condenser tubes. The uniform distribution of the exhaust steam over the top of the condenser tubes prevents localized areas of high velocity steam that may otherwise cause harmful condenser tube vibration.

Again referring to FIG. 2, the exhaust steam that is distributed over the thin walled condenser tubes 19 is cooled by the flow of the coolant 86 circulating through the tubes. As the steam cools, it condenses. The condensed steam falls to the bottom of the condenser and collects in the condenser hotwell 20. The large number of condenser tubes 19 has a large amount of surface area. During construction of typical power plants, the large surface area of the condenser tubes is often contaminated with dust, dirt and construction debris. The tight clearances between the large number of small diameter tubes makes it difficult to manually clean or flush these surfaces prior to the initial introduction of steam to the condenser. As a result, it is common for the initial condensate generated in the condenser to contain high concentrations of both particulate and non-particulate contamination. Prior art steamblow practices for the removal of particulate contamination do not provide a means of effectively removing such contamination from the condensate collected in the hotwell.

In the preferred embodiment of the present invention, a means is provided to address the contamination in the condensate initially collected in the condenser hotwell 20. A temporary pump 109 that is capable of pumping condensate contaminated with small particulate contamination is connected to the hotwell 20 by temporary suction piping 110. A large temporary porous screen 111 is installed in the hotwell 20 to prevent contamination that is too large for the temporary pump 109 to handle from entering the temporary suction piping 110. Due to the very low pressure in the hotwell as a result of the vacuum drawn on the condenser 18 by the vacuum system 24 the net positive suction head to the temporary hotwell pump is very low. In the preferred embodiment of the present invention, the net positive suction head to the temporary hotwell pump 109 may be increased by the installation of a temporary recirculation line 112 from the discharge of the temporary hotwell pump. At the end of the temporary recirculation line, a nozzle is installed in a position to discharge a stream of high velocity condensate into the suction of the temporary hotwell pump. The velocity of the recirculated condensate induces the flow of additional condensate from the hotwell 20 into the suction of the temporary hotwell pump 109 increasing the net positive suction head to the pump thus allowing the pump to function properly with a vacuum on the condenser.

A sample point 113 is also located on the discharge header of the temporary hotwell pump 109 to allow the condensate to be sampled for both particulate and none particulate contamination. Initially, the condensate from the hotwell 20 will be highly contaminated with both particulate and none particulate contamination. The present invention provides for the installation of temporary waste condensate piping 114 from the discharge of the temporary hotwell pump 109 to convey the initial dirty condensate from the hotwell to waste. In prior art practices, highly contaminated condensate from the initial steam introduced to the condenser 18 and collected in the hotwell 20 cannot be completely discharged from the system as this condensate is typically the only source of condensate to supply the suction of the plant condensate pump 21. The suction strainer 23 on the plant condensate pump 21 has only a limited capability to remove particulate contamination from the hotwell condensate and is not capable of remove non-particulate contamination from the hotwell condensate. Although prior art practices sometimes provide for the removal of a portion of the highly contaminated condensate that is discharged from the system or cleansed by treatment through filters and possibly ion exchange resin beds, typically the majority of the highly contaminated condensate is returned to the HRSG 3. As a result under the prior art, the time required to cleanse the system of fine particulate and non-particulate contamination is significantly extended.

In the preferred embodiment of the present invention, as long as the analysis of the condensate sample 113 shows the condensate to be highly contaminated with non-particulate contamination, the condensate pumped from the hotwell 20 will be discharged to waste 114. Once analysis of the condensate taken from sample point 113 shows the level of non-particulate contamination is sufficiently low to allow the return of the condensate to the HRSG 3, the discharge of the temporary hotwell pump will be diverted from the waste line 114 to a series of temporary filters 115. The temporary filters 115 are designed to remove fine particulate contamination from the condensate removed from the hotwell 20 by the temporary hotwell pump 109. The temporary filters 115 are designed to have the capacity to filter particulate contamination that is as much as ten times smaller than the particulate contamination removed by the normal condensate pump suction strainer 23.

In the preferred embodiment of the present invention, the temporary filters 115 consist of a multiple number of filter vessels arranged to work in parallel to each other. The design of these temporary filters allows individual filters to be isolated from operation and cleaned without interruption of the operation of the parallel units. In this manner, high flows of particulate contaminated hotwell condensate can be filtered to remove large quantities of fine particulate contamination from the condensate that would otherwise be recirculated back into the condensate system 22.

From the outlet of the temporary filters, the condensate enters a clean condensate header 116. A sample point 117 is located on the clean condensate header 116 to provide a means of testing the condensate to insure that it is sufficiently clean to be returned to the HRSG 3. From the clean condensate header 116, temporary waste condensate piping 118 is install to allow disposal of condensate that is not suitable for return to the HRSG 3. Once the analysis of the condensate sample taken from sample point 117 proves an acceptable level of condensate cleanliness, the clean condensate may be diverted through temporary piping 119 to the suction of the plant condensate pump 21. A supply of clean condensate to the suction of the plant condensate pump may also be supplied from a temporary clean condensate storage tank 121 through temporary piping 120. The reserve volume of clean condensate in temporary tank 121 provides an assured source of clean condensate to the plant condensate pump 21 until such time as the supply of clean condensate returned from the hotwell 20 through the temporary filters 115 is available. The volume of clean condensate in temporary storage tank 121 is also replenished by make-up demineralized water from the plant or from temporary water purification equipment supplied to the temporary condensate storage tank 121 by temporary condensate supply piping 122.

The temporary condensate storage tank 121 and the temporary condensate supply piping 120 are sized to provide a sufficient reserve of clean condensate to meet the condensate requirements of the HRSG 3 until cleansed exhaust steam is admitted to the condenser 18 from the outlet header of the cyclonic separator 78 and clean condensate can be supplied from the temporary hotwell pump 109 through the filters 115.

In the preferred embodiment of the present invention, a temporary clean condensate pump 123 is also provided to transfer condensate from the temporary condensate storage tank 121 to a temporary quench condensate distribution header 124. The temporary quench condensate distribution header 124 is designed to provide an assured flow of clean quench condensate to the various condensate injection points 38, 44 and 45 used to control the temperature of the steam during the operation of the HRSG 3 for the purposes of removing both particulate and non-particulate contamination from the steam systems as well as to allow for the simultaneous tuning of the combustion systems of the gas turbine 1. Due to the potential harm that may be caused to various plant systems by a sudden loss of condensate flow to the quench condensate injection points 38, 44 and 45, one or more redundant temporary clean condensate pumps 125 are also provided. In the preferred embodiment of the present invention, at least one of these redundant temporary clean condensate pumps is powered by a diesel engine or some other power supply separate from the normal plant power supply system. The volume of clean condensate stored in the temporary clean condensate storage tank 121 and the redundant temporary clean condensate pumps 125 provide assurance that the system may be safely shut down in the event of a plant wide power failure or the mechanical failure of the primary clean condensate pump 123, the temporary hotwell pump 109 or the plant condensate pump 21.

To provide further redundancy in the supply of clean condensate to the temporary quench condensate header 124, the preferred embodiment of the present invention also provides for the connection of the temporary demineralized water or condensate supply header 122 to the temporary quench condensate header. In a preferred embodiment of the present invention, the temporary quench condensate distribution header 124 is also supplied condensate from the discharge of the plant condensate pump 21 through a temporary supply line 127

The significance of the ability of the present invention to remove high concentrations of both fine particulate and non-particulate contamination from the condensate that is supplied to the plant condensate pump 21 as well as to the quench condensate injection points 38, 44 and 45 is better appreciated when one considers the fact that the injection of the condensate into the exhaust steam as well as the injection of condensate, in the form of boiler feedwater, into steam in the HRSG 3 will reintroduce any particulate and non-particulate contamination remaining in the condensate back into the steam being used to flush the system. The ability to more effectively remove both particulate and non-particulate contamination from the steam in a single operation provides for a cleaner system in less time and for the expenditure of less fuel and high quality water.

In addition to the ability to simultaneously remove both particulate and non-particulate contamination from the steam circuits of the HRSG 3 and plant steam piping systems 5, 9, 10, 11 and 16, the preferred embodiment of the present invention also provides for the addition of volatile chemical agents to the clean condensate by means of one or more temporary chemical dosing pumps 128 that transfer chemical concentrates from temporary chemical storage tanks 129 into the temporary clean condensate storage tank 121.

The temporary chemical dosing pumps 128 may be used to add agents to increase the system pH to enhance silica removal as well as to add chemical agents to promote the formation of a stable passive film on the plant steam cycle metal surfaces.

Once the steam discharged from the high-pressure steam piping 5 is determined by the target insertion device 43 to be sufficiently clean to be returned to the HRSO 3 by way of the steam turbine exhaust piping 9, the configuration of the steam path may be changed by the operation of valves on the permanent plant or the temporary piping systems. In certain cases, the plant high-pressure steam bypass valve 30 may be first opened to discharge steam from the high-pressure steam piping 5 through piping 9 toward the exhaust of the high-pressure steam turbine, into the temporary piping 39 and through temporary valve 130 and finally into the steam exhaust header 43. Typically the maximum design temperature of the plant piping 9 is lower than the normal operating temperature of the high-pressure steam header 5. As a result, it is common practice for the high-pressure steam bypass valve 30 to be equipped with a water injection system 131 to cool the steam that is discharged into the high-pressure steam turbine exhaust piping 9. The temperature of the steam exiting the high-pressure steam section of the HRSG 3 may also be regulated by the operation of yet another water injection point 132 on the superheater section of the HRSG high-pressure steam circuit.

When this above described practice is employed, it is done to remove gross particulate contamination from the high-pressure steam turbine exhaust piping 9 before the steam is discharged back to the HRSG reheater 133. Once the exhaust steam cleanliness from the piping 9 as measured by the target insertion device 43 is deemed sufficiently clean to safely direct steam flow through the reheater section 133 of the HRSG 3, the configuration of the plant and temporary piping valves may be changed to direct all of the exhaust steam through the reheater section 133. These valve changes will include the closing of the temporary valve 130 and the plant high-pressure steam bypass valve 30. In the resulting flow configuration the high-pressure exhaust steam is routed from the high-pressure steam piping 5 through the temporary piping 37 and 39 into the exhaust piping 9 from the high-pressure steam turbine 6.

Once all of the steam is being exhausted through the reheater section 133 of the HRSG 3, the temperature of the steam at the reheater exhaust may be controlled by operation of yet another water injection point 134 in the reheater section. The water used to control steam temperatures at the injection points 131, 132 and 134 is typically obtained from the boiler feedwater pumps 135 that take suction from the low-pressure steam generator drum 136. The process and equipment described by the present invention assures that the condensate supplied from the condensate pumps 21 through the condensate supply system 22 to the low-pressure steam generator drum 136 that is in turn supplied to the boiler feedwater pumps 135 has been cleansed of particulate and non-particulate contaminant concentrations that may otherwise impede the complete removal of such contamination from the steam circuits being flushed by the present invention.

The high concentrations of volatile chemical additives added to the condensate supplied to the boiler feedwater pumps 135 by the temporary chemical injection pumps 128 provides a means of application of the volatile chemical agents in the form of an annular mist directly to the steam circuits being flushed through the aforementioned injection points 131, 132 and 134.

Once the full steam flow is discharged through the reheater 133, the steam flow will pass through the intermediate-pressure steam piping 11 to the intermediate-pressure steam stop valve 13. The intermediate-pressure steam stop valve 13 is kept closed or stoppled to prevent contaminated steam from entering the intermediate steam turbine 12. From the hot intermediate-pressure steam piping 11, the contaminated exhaust steam flow is conveyed by temporary piping 137 to the exhaust steam header 42. The contaminated exhaust steam that enters the exhaust steam header 42 is in turn cleansed by the combined treatment of the temporary wash condensate injection points 44 and 45, the coalescer section 46 and the cyclonic separator section 58.

In the preferred embodiment of the present invention, the firing rate of the combustion turbine generator 1 is increased during the course of the flushing of the plant steam circuits to complete the initial tuning of the combustion systems. As the firing rate of the combustion turbine generator is increased, sufficient heat will pass through the exhaust duct 2 of the combustion gas turbine 1 to result in the generation of significant volumes of steam from the intermediate-pressure steam generating section 138 of the HRSG 3. Typically the steam generated in this section of the HRSG 3 is discharged into the inlet of the reheater section 133 by permanent plant piping 10. Due to the higher firing rates facilitated by the capture of the exhaust steam condensate by the condenser 18 as described by the present invention, the steam flow rates generated from the intermediate-pressure steam generator section 133 are sufficient to provide a complete flushing of this section simultaneous to the flushing of the high-pressure steam piping 5, the intermediate steam piping 9 and 11 as well as the reheater section 133.

As the firing rate of the combustion turbine generator is increased, sufficient heat will also pass through the exhaust duct 2 of the combustion gas turbine 1 to result in the generation of significant volumes of steam from the low-pressure steam generating section 139 of the HRSG 3. The steam generated by the low-pressure section 139 of the HRSG 3 is discharged through the low-pressure steam piping 16 to the low-pressure steam turbine stop valve 17. This stop valve 17 is kept closed or stoppled to prevent contaminated steam from entering the low-pressure steam turbine 15. The contaminated exhaust steam is diverted from the low-pressure steam piping 16 by temporary piping 140 into the exhaust steam header 42.

The ability to effectively flush all steam circuits, high-pressure, intermediate-pressure and low-pressure simultaneously as described by the methods and equipments of the present invention, further reduces the amount of time, fuel and high quality water required to remove both particulate and non-particulate contamination from the steam circuits.

The cleanliness of the exhaust steam is monitored by means of the target insertion points 29 and 43. The level of non-particulate contamination is monitored by the sample points 75 and 113. The operation of the steam flush is continued until acceptable levels of both particulate and non-particulate contamination are achieved and the initial tuning of the combustion turbine generator combustion systems is complete. Experience has shown that with the high flow and temperature conditions generated by the operation of the combustion gas turbine at firing rates well in excess of those typically used in prior art methods, acceptable levels of the cleanliness of the steam circuits can be achieved in as little as a single day of fired operation.

In the preferred embodiment of the present invention, once the main steam flow paths 5, 9, 10, 11 and 16 from the HRSG 3 to the steam turbine sections 6, 12 and 15 are acceptably clean, the plant valves alignment is arranged to also steam flush the reheat bypass piping 84 through the reheat bypass valve 33 to the steam distributor 34 in the condenser 18. In the preferred embodiment of the present invention, the plant valve alignment on the low pressure steam header 16 is also aligned to steam flush the low pressure bypass piping 141 through the low-pressure bypass valve 35 to the steam distributor device 36 to the condenser 18. Although some prior art practices call for the mechanical cleaning of these bypass lines prior to the initial flow of steam through these lines, the prior art does not provide any protection to the thin walled condenser tubes 19 from any entrained contamination that may be flushed from these lines into the condenser. In the preferred embodiment of the present invention, a level of protection to these thin walled condenser tubes 19 is provided by the installation of the impingement shield 104 as previously described.

As applied to steam generation systems that combust coal or other solid fuels, the present invention will allow the steam circuits to be rid of both particulate and non-particulate contamination while the combustion burners, fuel handling systems, ash handling systems and combustion flue gas treatment equipment of the plant is initially tuned. The size of the particular plant being flushed and the presence of multiple units may result in a requirement for the use of multiple temporary wash condensate injection systems, temporary coalescer sections, temporary cyclonic separators, temporary clean condensate storage tanks, temporary hotwell pumps, temporary filters, temporary clean condensate storage tanks, temporary quench condensate pumps, and temporary chemical addition equipments. Variations in the configuration of plant piping systems will also result in variations in the configuration of the temporary piping systems, target insertion points and sample points described.

The foregoing disclosure and description of the invention is illustrative and explanatory thereof, and various changes in the method steps as well as in the details of the apparatus may be made within the scope of the appended claims without departing from the spirit of the invention. It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Apparatus for use in a process for commissioning a steam plant with permanent equipment including a permanent steam generator, a permanent turbine or other prime mover, a permanent condenser with an inlet opening and with internal cooling means and a condenser hotwell and with permanent piping to form with said equipment items as a steady-state, closed loop steam flow circuit power cycle, using said commissioning apparatus constructed and arranged to revise the plant from an initial state of containing particulate and/or non-particulate contamination, due to construction or refurbishing, to a state of readiness for steady-state normal operation, the commissioning process comprising providing temporary piping and temporary equipment items engageable to the said permanent equipment items and piping of the steam plant, for commissioning steps including passing steam from the steam generator to the condenser bypassing the turbine and including a routing of condensate to the commissioning temporary piping to wash steam therein with injected condensate and more particularly, wherein the commissioning apparatus comprises:
(a) a permanent or temporary distributor device in the condenser for passing steam that bypasses the turbine into the condenser; and
(b) a temporary porous barrier within the permanent condenser for the duration of the commissioning process and removable after commissioning and while interposed in the full steam flow path through the condenser spanning the area of the condenser above the cooling means and configured for providing a tortuous path for the steam through the barrier to slow liquid droplets in the steam but allow continued movement towards the cooling means through the tortuous path and also constructed and arranged for preventing unimpeded high velocity steam droplet impact on the cooling means of liquid droplets or particulate solids, if any, in the steam and constructed and arranged to provide a pressure drop across the barrier,
the temporary barrier being made of multiple parts insertable through the condenser inlet to be assembled within the condenser and disassembled therein and removable via the condenser inlet after completion of the commissioning process.

* * * * *